United States Patent
Okamoto et al.

(10) Patent No.: US 11,303,359 B2
(45) Date of Patent: Apr. 12, 2022

(54) COMMUNICATION SYSTEM, OPTICAL TRANSMITTING APPARATUS, AND OPTICAL RECEIVING APPARATUS

(71) Applicant: NIPPON TELEGRAPH AND TELEPHONE CORPORATION, Tokyo (JP)

(72) Inventors: Seiji Okamoto, Musashino (JP); Fukutaro Hamaoka, Musashino (JP); Masanori Nakamura, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/265,823

(22) PCT Filed: Jul. 2, 2019

(86) PCT No.: PCT/JP2019/026264
§ 371 (c)(1),
(2) Date: Feb. 4, 2021

(87) PCT Pub. No.: WO2020/031554
PCT Pub. Date: Feb. 13, 2020

(65) Prior Publication Data
US 2021/0384983 A1 Dec. 9, 2021

(30) Foreign Application Priority Data
Aug. 7, 2018 (JP) .............................. JP2018-148595

(51) Int. Cl.
*H04B 10/516* (2013.01)
*H04B 10/61* (2013.01)
(Continued)

(52) U.S. Cl.
CPC ........... *H04B 10/516* (2013.01); *H04B 10/61* (2013.01); *H04B 10/6932* (2013.01); *H04L 27/36* (2013.01); *H04L 27/38* (2013.01)

(58) Field of Classification Search
CPC .................. H04B 10/516; H04B 10/548–5561
See application file for complete search history.

(56) References Cited

U.S. PATENT DOCUMENTS

2018/0091225 A1* 3/2018 Wang .................. H04B 10/541
2018/0269979 A1* 9/2018 Zhang ................ H04B 10/5161
2019/0109752 A1* 4/2019 Zhang .................. H04L 27/345

OTHER PUBLICATIONS

M. P. Yankov, D. Zibar, K. J. Larsen, L. P. B. Christensen and S. Forchhammer, "Constellation Shaping for Fiber-Optic Channels With QAM and High Spectral Efficiency," in IEEE Photonics Technology Letters, vol. 26, No. 23, pp. 2407-2410, 1 Dec. 1, 2014, doi: 10.1109/LPT.2014.2358274. (Year: 2014).*

(Continued)

*Primary Examiner* — Nathan M Cors

(57) ABSTRACT

There is provided a communication system, wherein: an optical transmission apparatus has: a first storage unit that stores amplitude distribution information, which is information representing a distribution of occurrence probabilities of symbols of an optical signal, in association with a modulation rate of an optical signal; a control unit that selects the modulation rate based on a signal band that is a band determined by the modulation rate and a device band that is a band in which a transmission path and the like allow passage of an optical signal, and controls an occurrence probability of a symbol of an optical signal based on the amplitude distribution information; and an optical transmitter that transmits an optical signal of a symbol of which the occurrence probability is controlled; and an optical reception apparatus has: an optical receiver that receives an optical signal of a symbol; a second storage unit that stores the amplitude distribution information in association with the modulation rate; and a decoding unit that detects the selected modulation rate, and decodes a symbol of a received optical signal based on the amplitude distribution information associated with the detected modulation rate.

8 Claims, 12 Drawing Sheets

(51) Int. Cl.
H04L 27/38 (2006.01)
H04L 27/36 (2006.01)
H04B 10/69 (2013.01)

(56) References Cited

OTHER PUBLICATIONS

M. P. Yankov et al., "Constellation Shaping for WDM systems using 256QAM/1024QAM with Probabilistic Optimization," Sep. 2016; Journal of Lightwave Technology; doi: 10.1109/JLT.2016.2607798. (Year: 2016).*
T. Rahman et al., "FEC Overhead Optimization for Long-Haul Transmission of PM-16QAM based 400Gb/s Super-Channel", ECOC2014, 2014.

* cited by examiner

COMMUNICATION SYSTEM, OPTICAL TRANSMITTING APPARATUS, AND OPTICAL RECEIVING APPARATUS

CROSS-REFERENCE TO RELATED APPLICATIONS

This application is a 371 U.S. National Phase of International Application No. PCT/JP2019/026264, filed on Jul. 2, 2019, which claims priority to Japanese Application No. 2018-148595 filed on Aug. 7, 2018. The entire disclosures of the above applications are incorporated herein by reference.

TECHNICAL FIELD

The present invention relates to a communication system, an optical transmission apparatus, and an optical reception apparatus.

BACKGROUND ART

A communication system using an optical signal has a limitation that the band of an optical signal (hereinafter referred to as "signal band") cannot exceed a band in which each device such as an optical transmission apparatus, an optical reception apparatus, and a transmission path allows passage of an optical signal (hereinafter referred to as "device band"). For this reason, the signal band may be narrowed according to the device band. Narrowing the signal band deteriorates the transmission characteristics of the optical signal. In order to prevent the signal band from being narrowed, the communication system needs to adjust the modulation rate of the optical signal so that the signal band may be a narrower band than the device band (see Non-Patent Literature 1).

CITATION LIST

Non-Patent Literature

Non-Patent Literature 1: T. Rahman et al., "FEC Overhead Optimization for Long-Haul Transmission of PM-16QAM based 400 Gb/s Super-Channel", ECOC2014, Cannes-France, P.5.17

SUMMARY OF THE INVENTION

Technical Problem

The communication system can improve the frequency utilization efficiency by increasing the multi-value level of a symbol of an optical signal according to the device band. However, since the multi-value level of a symbol is a discrete value, the communication system may not necessarily be able to increase the transmission capacity of an optical signal even when increasing the multi-value level. Thus, conventional communication systems have a problem of not being able to increase the transmission characteristics of an optical signal.

In view of the above circumstances, an object of the present invention is to provide a communication system, an optical transmission apparatus, and an optical reception apparatus capable of improving the transmission characteristics of an optical signal.

Means for Solving the Problem

One aspect of the present invention is a communication system comprising an optical transmission apparatus, an optical reception apparatus, and a transmission path for an optical signal, wherein: the optical transmission apparatus has: a first storage unit that stores amplitude distribution information, which is information representing a distribution of occurrence probabilities of symbols of an optical signal, in association with a modulation rate of an optical signal; a control unit that selects the modulation rate based on a signal band that is a band determined by the modulation rate and a device band that is a band in which the optical transmission apparatus, the optical reception apparatus, and the transmission path allow passage of an optical signal, and controls an occurrence probability of a symbol of an optical signal based on the amplitude distribution information associated with the selected modulation rate; and an optical transmitter that transmits an optical signal of a symbol of which the occurrence probability is controlled; and the optical reception apparatus has: an optical receiver that receives an optical signal of a symbol of which the occurrence probability is controlled; a second storage unit that stores the amplitude distribution information in association with the modulation rate; and a decoding unit that detects the selected modulation rate, and decodes a symbol of a received optical signal based on the amplitude distribution information associated with the detected modulation rate.

One aspect of the present invention is the communication system described above, wherein the control unit selects the modulation rate so that the signal band coincides with the device band or the signal band is narrower than the device band.

One aspect of the present invention is the communication system described above, wherein the control unit controls an occurrence probability of a symbol of an optical signal to be transmitted so that a distribution of occurrence probabilities of symbols in a constellation map becomes a distribution of occurrence probabilities of symbols in the amplitude distribution information.

One aspect of the present invention is the communication system described above, wherein a distribution of occurrence probabilities of symbols is a Maxwell-Boltzmann distribution.

One aspect of the present invention is the communication system described above, wherein the control unit selects the modulation rate based on information on the device band fed back from the optical reception apparatus to the optical transmission apparatus and information on the signal band.

One aspect of the present invention is an optical transmission apparatus in a communication system comprising the optical transmission apparatus, an optical reception apparatus, and a transmission path for an optical signal, the optical transmission apparatus comprising: a storage unit that stores amplitude distribution information, which is information representing a distribution of occurrence probabilities of symbols of an optical signal, in association with a modulation rate of an optical signal; a control unit that selects the modulation rate based on a signal band that is a band determined by the modulation rate and a device band that is a band in which the own apparatus, the optical reception apparatus, and the transmission path allow passage of an optical signal, and controls an occurrence probability of a symbol of an optical signal based on the amplitude distribution information associated with the selected modulation rate; and an optical transmitter that transmits an optical signal of a symbol of which the occurrence probability is controlled.

One aspect of the present invention is the optical transmission apparatus described above, wherein the control unit selects the modulation rate so that the signal band coincides with the device band or the signal band is narrower than the device band.

One aspect of the present invention is an optical reception apparatus in a communication system comprising an optical transmission apparatus, the optical reception apparatus, and a transmission path for an optical signal, the optical reception apparatus comprising: an optical receiver that receives an optical signal of a symbol of which an occurrence probability is controlled; a storage unit that stores amplitude distribution information, which is information representing a distribution of occurrence probabilities of symbols of an optical signal in association with a modulation rate of an optical signal; and a decoding unit that detects the modulation rate selected by the optical transmission apparatus, and decodes a symbol of a received optical signal based on the amplitude distribution information associated with the detected modulation rate.

Effects of the Invention

The present invention can improve the transmission characteristics of an optical signal.

DESCRIPTION OF EMBODIMENTS

Embodiments of the present invention will be described in detail with reference to the drawings.

First Embodiment

Figure 1:
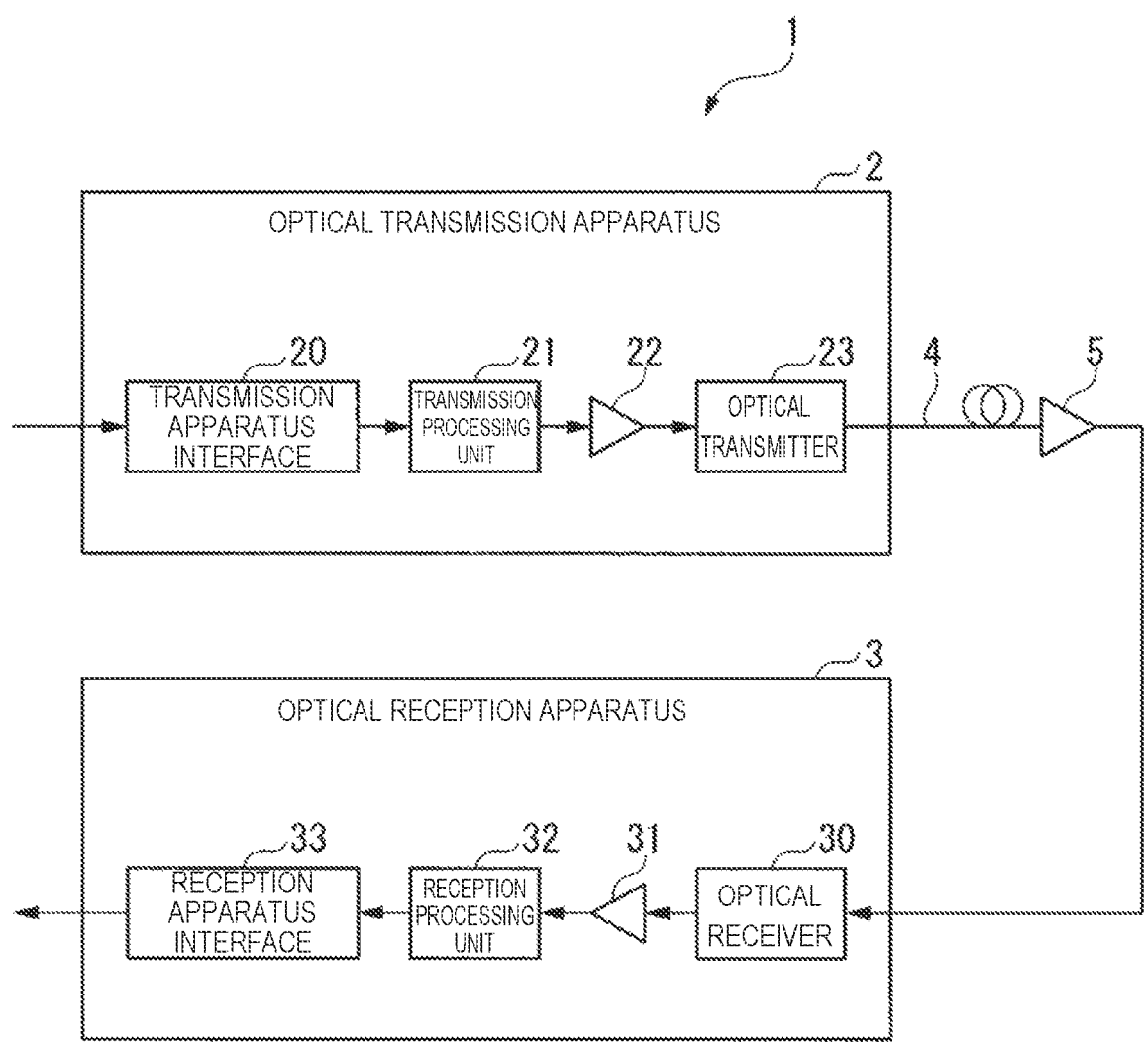
FIG. 1 is a diagram showing an example configuration of a communication system in a first embodiment.

FIG. 1 is an example configuration of a communication system 1. The communication system 1 comprises an optical transmission apparatus 2 and an optical reception apparatus 3. The communication system 1 comprises an optical fiber 4 and an amplification unit 5 as a transmission path. The optical transmission apparatus 2 and the optical reception apparatus 3 communicates with each other via the transmission path using an optical signal.

The optical transmission apparatus 2 and the optical reception apparatus 3 may store a software program in a non-volatile storage apparatus (non-transitory recording medium) such as a flash memory. At least part of the functions of the optical transmission apparatus 2 and the optical reception apparatus 3 may be implemented using a software program.

The optical transmission apparatus 2 comprises a transmission apparatus interface 20, a transmission processing unit 21, a driver 22, and an optical transmitter 23. The transmission apparatus interface 20 acquires a bit sequence from a client apparatus (not shown). The transmission processing unit 21 encodes the acquired bit sequence. The driver 22 drives the optical transmitter 23 according to the encoded bit sequence. The optical transmitter 23 generates an optical signal according to the driving by the driver 22. The optical transmitter 23 transmits the generated optical signal to the optical reception apparatus 3 via the transmission path.

The optical reception apparatus 3 comprises an optical receiver 30, an amplifier 31, a reception processing unit 32, and a reception apparatus interface 33. The optical receiver 30 receives the optical signal from the optical transmission apparatus 2. The amplifier 31 converts the received optical signal into an analog received signal. The reception processing unit 32 converts the analog received signal into a digital received signal. The reception processing unit 32 decodes the bit sequence based on the digital received signal. The reception apparatus interface 33 transmits the decoded bit sequence to a predetermined client apparatus (not shown).

The optical fiber 4 transmits the optical signal. The amplification unit 5 amplifies the light intensity of the transmitted optical signal in the transmission path.

Next, an example configuration of the optical transmission apparatus 2 will be described.

Figure 2:
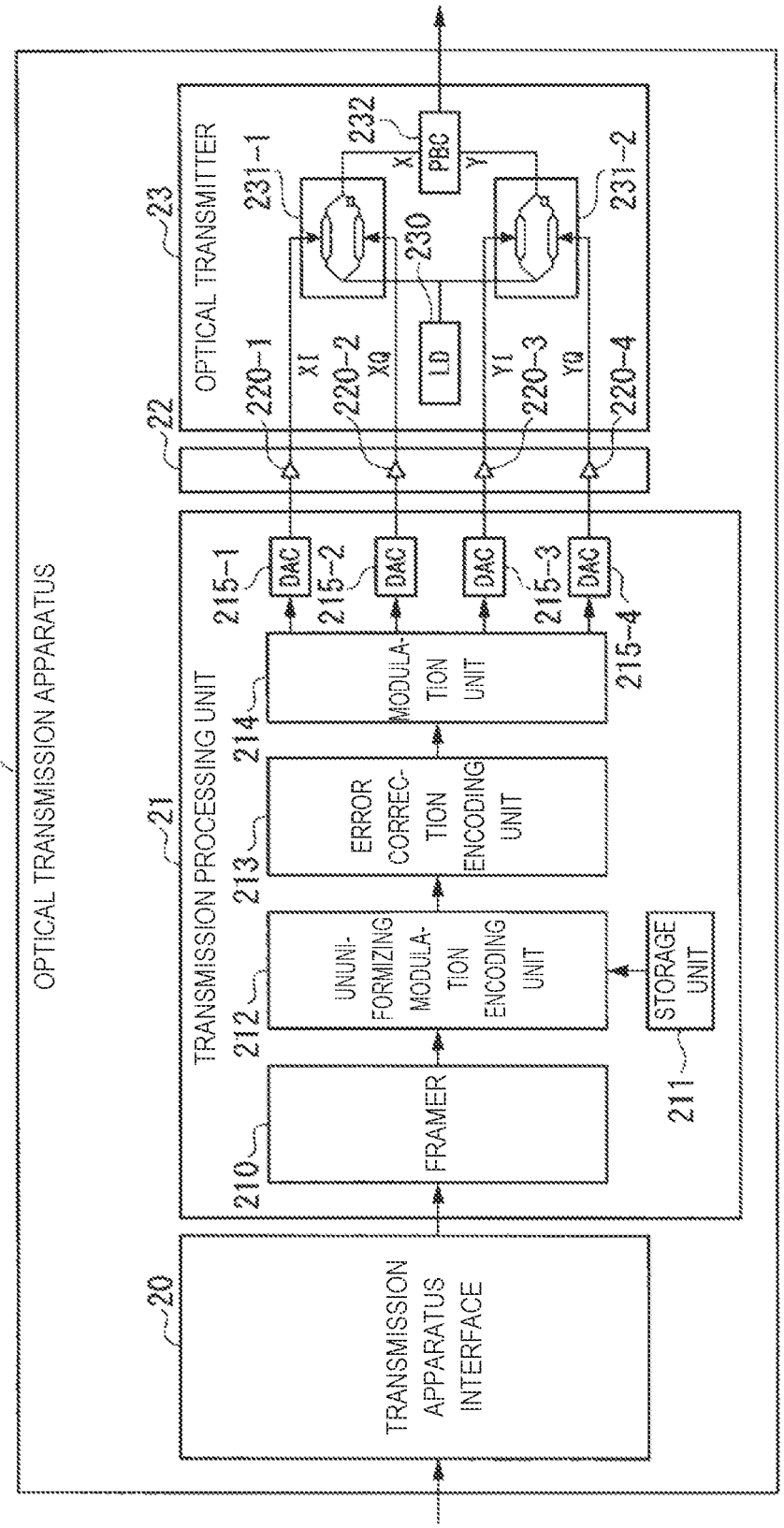
FIG. 2 is a diagram showing an example configuration of an optical transmission apparatus in the first embodiment.

FIG. 2 is an example configuration of the optical transmission apparatus 2. The transmission processing unit 21 comprises a framer 210, a storage unit 211, an ununiformizing modulation encoding unit 212, an error correction encoding unit 213, a modulation unit 214, and digital/analog conversion units 215.

The framer 210 acquires the bit sequence from the transmission apparatus interface 20. The framer 210 converts the acquired bit sequence into a bit sequence in a predetermined format (frame).

The storage unit 211 stores information representing a distribution of occurrence probabilities of symbols (amplitude sequence) of the optical signal in a constellation map (hereinafter referred to as "amplitude distribution information") for each modulation rate of the optical signal. Although the distribution of occurrence probabilities of symbols (amplitude sequence) of the optical signal (hereinafter referred to as "amplitude sequence distribution") is not limited to a distribution having a specific distribution shape, it is, for example, the Maxwell-Boltzmann distribution.

The device band is determined according to the sum of passbands of the respective devices such as the optical transmission apparatus 2, the optical reception apparatus 3, and the transmission path. The device band may be determined by an external apparatus based on simulation of a characteristic model of the device band, or may be determined by the external apparatus based on an actual measured value of the device band.

The ununiformizing modulation encoding unit 212 predetermines the amplitude sequence distribution according to the modulation rate of the optical signal so that the signal band may coincide with the device band or the signal band may be narrower than the device band. The ununiformizing modulation encoding unit 212 sets the amplitude sequence distribution to, for example, the Maxwell-Boltzmann distribution. The ununiformizing modulation encoding unit 212 records the amplitude distribution information representing the predetermined amplitude sequence distribution in the storage unit 211 for each modulation rate of the optical signal.

When the device band is known, the ununiformizing modulation encoding unit 212 selects a modulation rate of the optical signal so that the signal band may be narrower than the device band. This enables the ununiformizing modulation encoding unit 212 to prevent the signal band from being narrowed. When the device band is known, the ununiformizing modulation encoding unit 212 may select a modulation rate of the optical signal so that the signal band may coincide with the device band. This enables the ununiformizing modulation encoding unit 212 to improve the transmission characteristics of the optical signal.

The ununiformizing modulation encoding unit 212 acquires the amplitude distribution information associated with the selected modulation rate from the storage unit 211. The ununiformizing modulation encoding unit 212 acquires the bit sequence in the predetermined format from the framer 210. The ununiformizing modulation encoding unit 212 encodes the acquired bit sequence using an ununiformizing modulation technique based on the acquired amplitude distribution information.

The throughput of the bit sequence encoded by the ununiformizing modulation encoding unit 212 is higher than the throughput of the bit sequence acquired by the framer 210 from the transmission apparatus interface 20. The ununiformizing modulation encoding unit 212 outputs the encoded bit sequence to the error correction encoding unit 213.

The error correction encoding unit 213 corrects errors having occurred in the encoded bit sequence. The modulation unit 214 executes modulation processing on the error-corrected bit sequence.

Between a first polarization component X and a second polarization component Y that are orthogonal to each other, a digital/analog conversion unit 215-1 acquires an XI signal, which is an in-phase signal of the first polarization component X, from the modulation unit 214. The digital/analog conversion unit 215-1 converts the XI signal as a digital signal into the XI signal as an analog signal, and outputs the XI signal as an analog signal to the driver 22.

A digital/analog conversion unit 215-2 acquires an XQ signal, which is a quadrature signal of the first polarization component X, from the modulation unit 214. The digital/analog conversion unit 215-2 converts the XQ signal as a digital signal into the XQ signal as an analog signal, and outputs the XQ signal as an analog signal to the driver 22.

A digital/analog conversion unit 215-3 acquires a YI signal, which is an in-phase signal of the second polarization component Y, from the modulation unit 214. The digital/analog conversion unit 215-3 converts the YI signal as a digital signal into the YI signal as an analog signal, and outputs the YI signal as an analog signal to the driver 22.

A digital/analog conversion unit 215-4 acquires a YQ signal, which is a quadrature signal of the second polarization component Y, from the modulation unit 214. The digital/analog conversion unit 215-4 converts the YQ signal as a digital signal into the YQ signal as an analog signal, and outputs the YQ signal as an analog signal to the driver 22.

The driver 22 comprises modulator drivers 220-1 to 220-4. The modulator drivers 220-1 to 220-4 drive polarization modulators of the optical transmitter 23. The modulator driver 220-1 outputs the XI signal as an analog signal to the optical transmitter 23. The modulator driver 220-2 outputs the XQ signal as an analog signal to the optical transmitter 23. The modulator driver 220-3 outputs the YI signal as an analog signal to the optical transmitter 23. The modulator driver 220-4 outputs the YQ signal as an analog signal to the optical transmitter 23.

The optical transmitter 23 comprises a signal light source 230, polarization modulators 231, and a polarization beam combiner (PBC) 232. The signal light source 230 is a laser diode that outputs laser light. The signal light source 230 outputs laser light to the polarization modulators 231-1 and 231-2.

The polarization modulator 231-1 modulates laser light according to the XI signal and the XQ signal to generate an optical signal of the first polarization component X. The polarization modulator 231-1 outputs the generated optical signal of the first polarization component X to the polarization beam combiner 232.

The polarization modulator 231-2 modulates laser light according to the YI signal and the YQ signal to generate an optical signal of the second polarization component Y. The polarization modulator 231-2 outputs the generated optical signal of the second polarization component Y to the polarization beam combiner 232.

The polarization beam combiner 232 multiplexes the optical signal of the first polarization component Y and the optical signal of the second polarization component Y. The polarization beam combiner 232 transmits the multiplexed optical signal to the optical reception apparatus 3 via the transmission path.

Next, ununiformizing modulation executed by the ununiformizing modulation encoding unit 212 will be described.

The ununiformizing modulation encoding unit 212 executes modulation processing for ununiformizing the amplitude sequence distribution (ununiformizing modulation processing) on the bit sequence. The ununiformizing modulation encoding unit 212 encodes the bit sequence on which the ununiformizing modulation processing is executed. The ununiformizing modulation encoding unit 212 outputs a symbol of which the distribution of occurrence probabilities is ununiformized to the error correction encoding unit 213 as an encoding result of the bit sequence.

Figure 3:
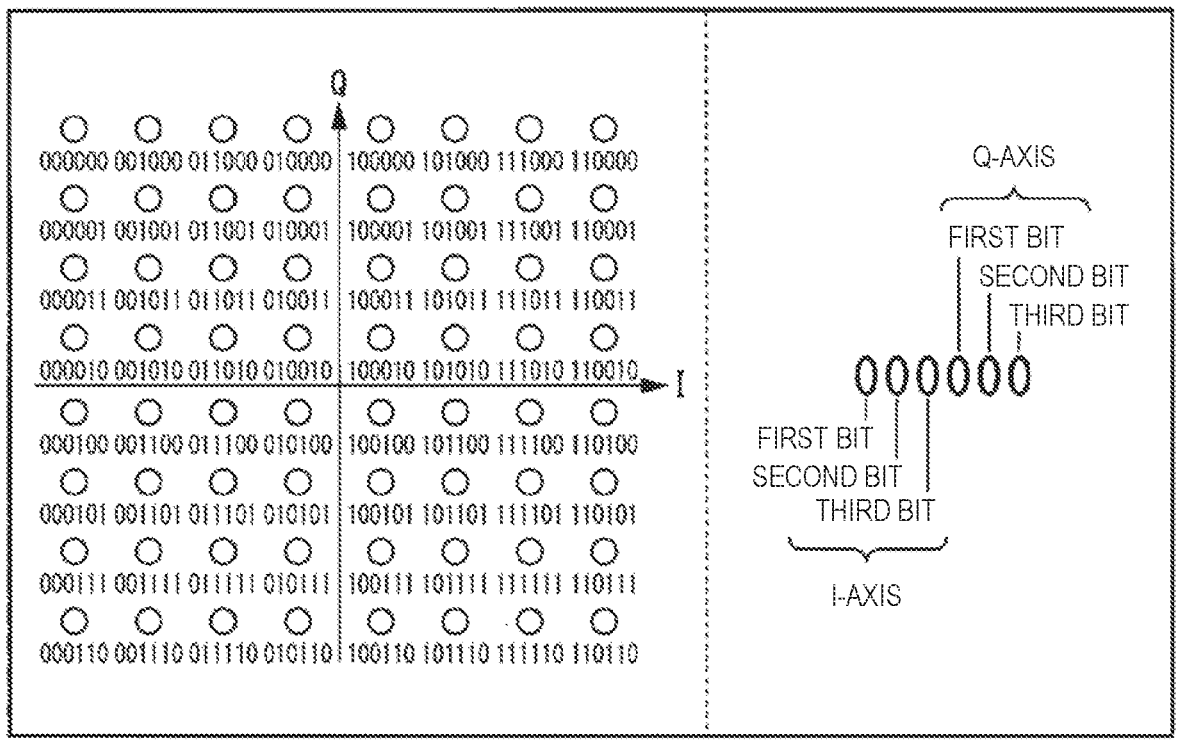
FIG. 3 is a diagram showing an example mapping of symbols in 64QAM in the first embodiment.

FIG. 3 is a diagram showing an example mapping of symbols (constellation map) in 64QAM (quadrature amplitude modulation). The bit length of the code of a symbol in 64QAM is 6 bits. A bit group influencing the position in the I-axis direction in the constellation map is 3 bits on the high-order side in the code of the symbol. A bit group influencing the position in the Q-axis direction in the constellation map is 3 bits on the low-order side in the code of the symbol.

In multi-valued quadrature amplitude modulation (QAM), the error rate is different depending on a bit position in the code of the symbol.

The bit length of the code of a symbol in $N^2$ (N=4, 8, 16 . . . ) QAM can be represented using a logarithm, and is ($2 \times \log_2 N$) bits. Bit groups influencing positions in the axis directions of the constellation map are represented, for each of the axes, as a bit group composed of ($\log_2 N$) bits. The bit positions in this bit group composed of ($\log_2 N$) bits are represented as the first bit, ..., the ($\log_2 N$)-th bit in the order from the most significant bit to the least significant bit.

For example, in the code of a symbol in 64 (=$8^2$) QAM (bit length=6 bit), bit groups influencing the positions in the axis directions in the constellation map are represented, for each of the axes, by a bit group composed of 3 (=$\log_2 8$) bits. The bit positions in this bit group composed of 3 bits are represented as the first bit, the second bit, and the third bit in the order from the most significant bit to the least significant bit.

In the constellation map, the codes of the symbols are assigned axisymmetrically with respect to the I-axis or Q-axis depending on the value of the first bit. That is, symbols are arranged collectively on the positive value side or negative value side of the I-axis or Q-axis depending on the value of the first bit.

For example, symbols of which the value of the first bit influencing the position in the I-axis direction is 0 are arranged collectively on the negative value side of the I-axis. In FIG. 3, the first bits influencing the positions in the I-axis direction are assigned (0, 0, 0, 0, 1, 1, 1, 1) from the negative value side of the I-axis toward the positive value side thereof.

For example, symbols of which the value of the first bit influencing the position in the Q-axis direction is 0 are arranged collectively on the positive value side of the Q-axis. In FIG. 3, the first bits influencing the positions in the Q-axis direction are assigned (1, 1, 1, 1, 0, 0, 0, 0) from the negative value side of the Q-axis toward the positive value side thereof.

Thus, in the constellation map, a group with the first bit of 1 is not divided into the positive value side and negative value side of an axis, but collected on the positive value side or negative value side of the axis. Similarly, a group with the first bit of 0 is not divided into the positive value side and negative value side of an axis, but collected on the positive value side or negative value side of the axis.

In FIG. 3, the second bits influencing the positions in the I-axis direction are assigned (0, 0, 1, 1, 0, 0, 1, 1) from the negative value side of the I-axis toward the positive value side thereof. The second bits influencing the positions in the Q-axis direction are assigned (1, 1, 0, 0, 1, 1, 0, 0) from the negative value side of the Q-axis toward the positive value side thereof.

Thus, in the constellation map, a group with the second bit of 1 is divided into the positive value side and negative value side of an axis. Similarly, a group with the second bit of 0 is divided into the positive value side and negative value side of the axis.

In FIG. 3, the third bits influencing the positions in the I-axis direction are assigned (0, 1, 1, 0, 0, 1, 1, 0) from the negative value side of the I-axis toward the positive value side thereof. The third bits influencing the positions in the Q-axis direction are assigned (0, 1, 1, 0, 0, 1, 1, 0) from the negative value side of the Q-axis toward the positive value side thereof.

It is determined whether the position of a symbol is a positive value or negative value on the I-axis depending on the value of the first bit in the bit group on the high-order side of the code of the symbol. Similarly, it is determined whether the position of a symbol is a positive value or negative value on the Q-axis depending on the value of the first bit in the bit group on the low-order side of the code of the symbol. Thus, in multi-valued quadrature amplitude modulation, as the order of a bit is higher in the bit group on the high-order or low-order side of the code of a symbol, the position of the symbol in the constellation map is more largely different depending on the value of the bit.

The symbols of codes of which only the values of the third bit in the bit group on the high-order side of the codes of the symbols are different are adjacent in the constellation map. Similarly, the symbols of codes of which only the values of the third bit in the bit group on the low-order side of the codes of the symbols are different are adjacent in the constellation map. Thus, in multi-valued quadrature amplitude modulation, as the order of a bit is lower in the bit group on the high-order or low-order side of the code of a symbol, the position of the symbol in the constellation map is less different depending on the value of the bit.

Next, the details of the ununiformizing modulation encoding unit 212 will be described.

The relationship among the transmission capacity, the frequency utilization efficiency, and the signal band of the optical signal is represented as Formula (1):

$$\text{Transmission capacity}[b/s] = \text{Frequency utilization efficiency}[b/s/Hz] \times \text{Signal band}[Hz] \quad (1)$$

As shown in Formula (1), even when the transmission capacity is the same, the frequency utilization efficiency and the signal band have a plurality of combinations.

The ununiformizing modulation encoding unit 212 can enhance the frequency utilization efficiency by increasing the multi-value level of a symbol of the optical signal.

Under the condition that the transmission capacity is constant, the higher the frequency utilization efficiency is, the narrower the signal band becomes. Since high frequency utilization efficiency is achieved using a modulated signal at a high multi-value level, a symbol interval on the constellation becomes short when the frequency utilization efficiency is high. When the symbol interval becomes short, noise tolerance is lowered, so that transmission over a long distance becomes difficult. Accordingly, the higher the frequency utilization efficiency is, the more the transmission characteristics deteriorate.

When the signal band is narrow (the modulation rate is low) under the condition that the transmission capacity is constant, the ununiformizing modulation encoding unit 212 enhances the frequency utilization efficiency based on Formula (1). Even when the signal band is less narrowed because the device band is wide, the transmission characteristics deteriorate if the frequency utilization efficiency is higher than necessary.

So, the ununiformizing modulation encoding unit 212 selects a modulation rate of the optical signal according to the device band. The signal band is determined according to the modulation rate of the optical signal. The ununiformizing modulation encoding unit 212 appropriately select a frequency utilization efficiency according to the signal band determined by the selected modulation rate. This enables the ununiformizing modulation encoding unit 212 to improve the transmission characteristics of the optical signal.

The ununiformizing modulation encoding unit 212 selects an amplitude sequence distribution according to the selected modulation rate. The ununiformizing modulation encoding unit 212 controls the distribution (distribution shape) of occurrence probabilities of the respective symbols in the constellation map based on the selected amplitude sequence distribution.

The signal band is uniquely determined accordingly to the amplitude sequence distribution selected by the ununiformizing modulation encoding unit 212. Note that there may be distributions in a plurality of kinds of shapes as amplitude sequence distributions achieving the same signal band.

Figure 4:
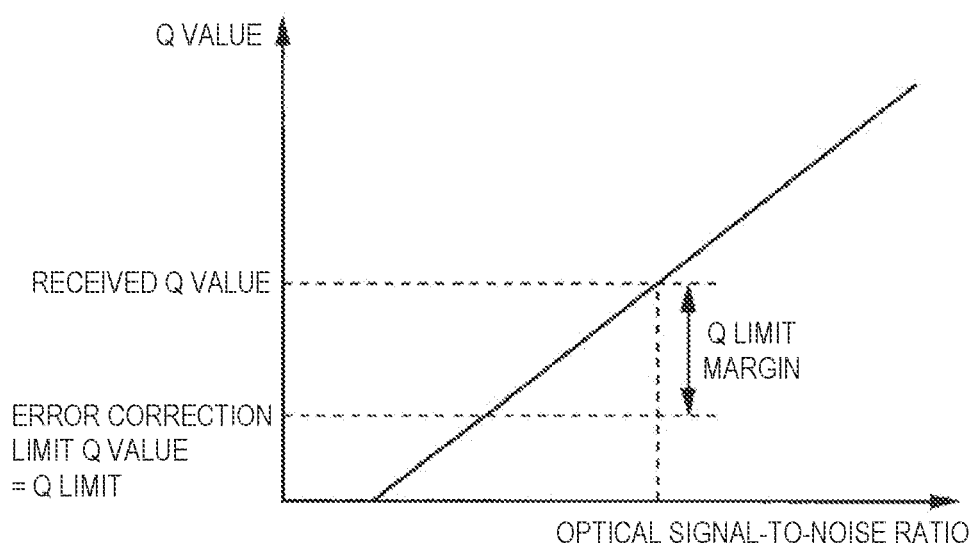
FIG. 4 is a diagram showing an example relationship between a band limit amount and a Q limit margin in the first embodiment.

FIG. 4 is an example relationship between an optical signal-to-noise ratio and a Q limit. The Q limit is an error correction limit of a Q value. A Q limit margin is the difference between the Q limit and a Q value at a predetermined optical signal-to-noise ratio.

Figure 5:
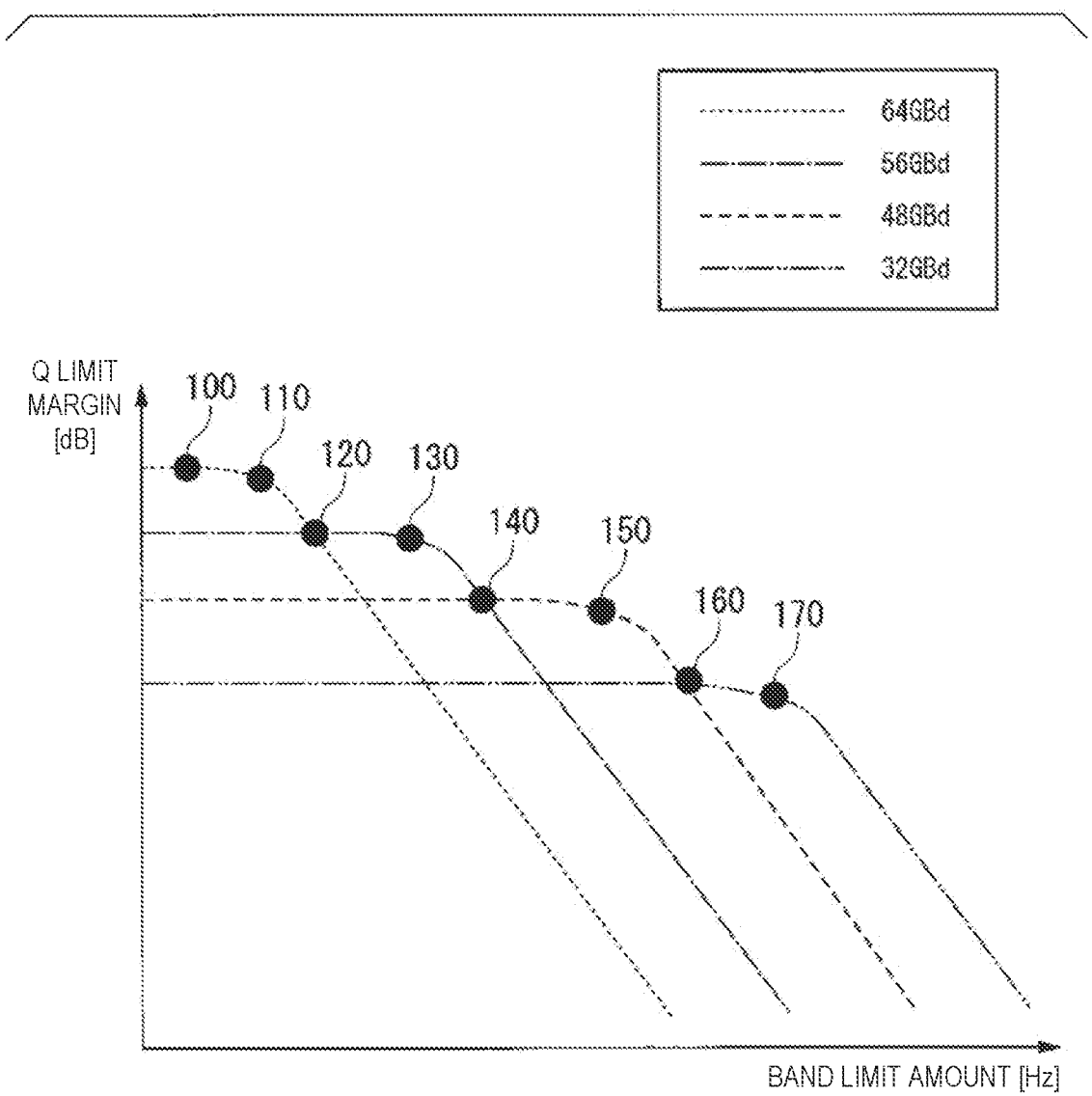
FIG. 5 is a diagram showing an example relationship between an optical signal-to-noise ratio and a Q limit in the first embodiment.

FIG. 5 is an example relationship between the band limit amount (device band) and the Q limit margin. In FIG. 5, the horizontal axis indicates the band limit amount [Hz]. The vertical axis indicates the Q limit margin [dB]. The Q limit margin [dB] decreases in the order from the mark 100 to the mark 170. The band limit amount [Hz] increases in the order from the mark 100 to the mark 170. That is, the device band becomes narrow in the order from the mark 100 to the mark 170.

Each mark from the mark 100 to the mark 120 indicates each point defined on a curve of the band limit amount versus the Q limit margin at a modulation rate of 64 GBd. Each mark from the mark 120 to the mark 140 indicates each point defined on a curve of the band limit amount versus the Q limit margin at a modulation rate of 56 GBd. Accordingly, the mark 120 indicates the intersection of the curve of the band limit amount versus the Q limit margin at a modulation rate of 64 GBd and the curve of the band limit amount versus the Q limit margin at a modulation rate of 56 GBd. In FIG. 5, the ununiformizing modulation encoding unit 212 switches the modulation rate to 64 GBd or 56 GBd at the mark 120 so that the Q limit margin may increase. In addition, the ununiformizing modulation encoding unit 212 may switch the modulation scheme (the multi-value level of symbols of the optical signal) so that the Q limit margin may increase.

Each mark from the mark 140 to the mark 160 indicates each point defined on a curve of the band limit amount versus the Q limit margin at a modulation rate of 48 GBd. Accordingly, the mark 140 indicates the intersection of the curve of the band limit amount versus the Q limit margin at a modulation rate of 56 GBd and the curve of the band limit amount versus the Q limit margin at a modulation rate of 48 GBd. In FIG. 5, the ununiformizing modulation encoding unit 212 switches the modulation rate to 56 GBd or 48 GBd at the mark 140 so that the Q limit margin may increase.

Each mark from the mark 160 to the mark 170 indicates each point defined on a curve of the band limit amount versus the Q limit margin at a modulation rate of 32 GBd. Accordingly, the mark 160 indicates the intersection of the curve of the band limit amount versus the Q limit margin at a modulation rate of 48 GBd and the curve of the band limit amount versus the Q limit margin at a modulation rate of 32 GBd. In FIG. 5, the ununiformizing modulation encoding unit 212 switches the modulation rate to 48 GBd or 32 GBd at the mark 160 so that the Q limit margin may increase.

Figure 6:
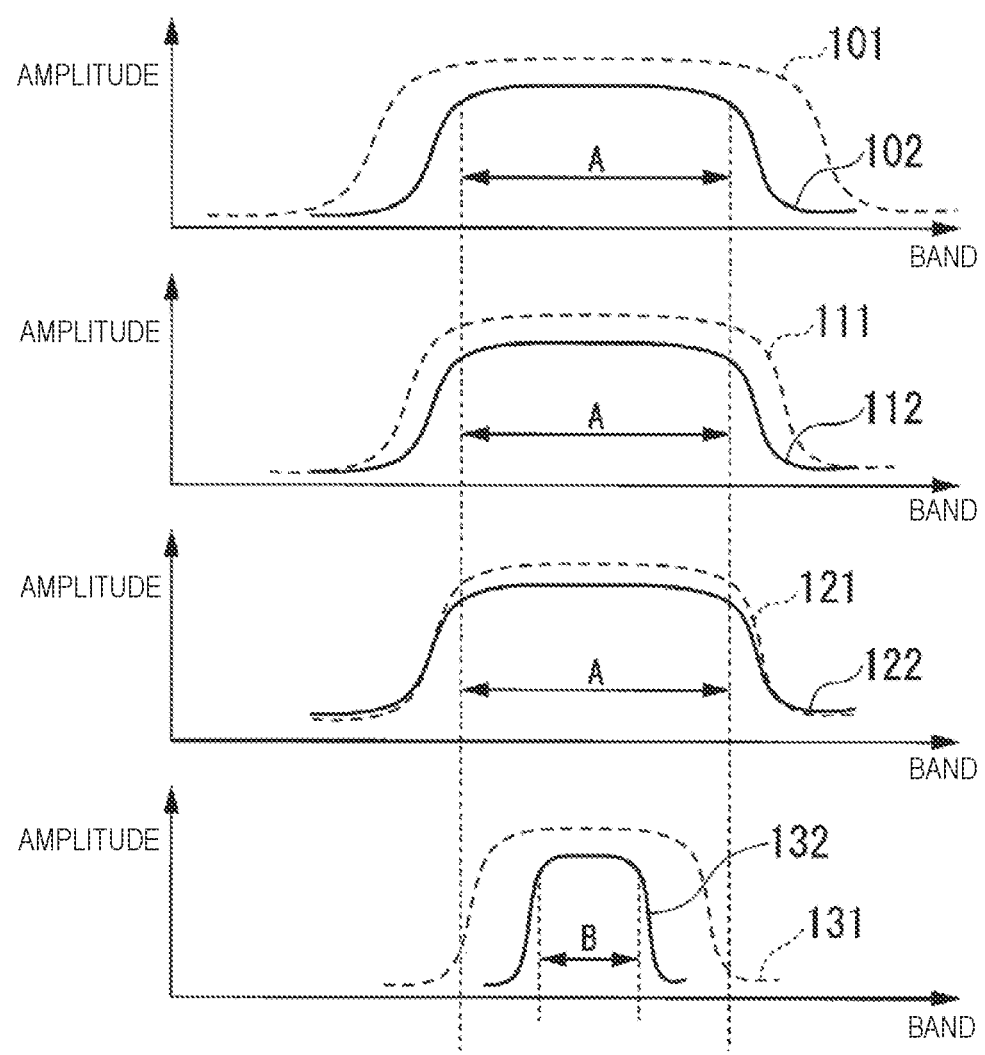
FIG. 6 is a diagram showing an example relationship between a band and amplitude in the first embodiment.

FIG. 6 is a diagram showing an example relationship between a band and amplitude. The horizontal axis of each graph indicates the band. The vertical axis of each graph indicates the amplitude. A predetermined band "A" shows a signal band at a modulation rate of 64 GBd. A predetermined band "B" is a narrower band than the band "A", and shows a signal band at a modulation rate of 56 GBd.

In order to prevent the signal band from being narrowed, the ununiformizing modulation encoding unit 212 adjusts the modulation rate of the optical signal so that the signal band may become narrower than the device band. The ununiformizing modulation encoding unit 212 may adjust the modulation rate of the optical signal so as to make the signal band coincide with the device band. This enables the ununiformizing modulation encoding unit 212 to suppress the deterioration of the transmission characteristics.

The first graph from the top is a graph showing the relationship between the device band and the amplitude of the optical signal (a device band curve 101) and the relationship between the signal band and the amplitude of the optical signal (a signal band curve 102) in the case where the band limit amount and the Q limit margin have the relationship shown at the mark 100 in FIG. 5. The ununiformizing modulation encoding unit 212 sets the signal band to, for example, the band "A" so as to match the signal band with the device band.

The second graph from the top is a graph showing the relationship between the device band and the amplitude of the optical signal (a device band curve 111) and the relationship between the signal band and the amplitude of the optical signal (a signal band curve 112) in the case where the band limit amount and the Q limit margin have the relationship shown at the mark 110 in FIG. 5. The ununiformizing modulation encoding unit 212 sets the signal band to, for example, the band "A" so as to match the signal band with the device band.

The third graph from the top is a graph showing the relationship between the device band and the amplitude of the optical signal (a device band curve 121) and the relationship between the signal band and the amplitude of the optical signal (a signal band curve 122) in the case where the band limit amount and the Q limit margin have the relationship shown at the mark 120 in FIG. 5. The ununiformizing modulation encoding unit 212 sets the signal band to, for example, the band "A" so as to match the signal band with the device band.

In the third graph from the top, the signal band (a signal band curve 122) does not necessarily exactly coincide with the device band (a device band curve 121). This is because signal distortion of the optical signal is compensated using an adaptive filter or the like and therefore, even when the signal band has slightly exceeded the device band, the signal distortion of the optical signal is compensated. For this reason, the ununiformizing modulation encoding unit 212 may switch the modulation rate to 64 GBd or 56 GBd when the signal band has exceeded the device band by a predetermined frequency. The signal band indicating a timing at which the ununiformizing modulation encoding unit 212 switches the modulation rate is determined by evaluating in advance a simulation result or an actual measured value of the transmission characteristics of the optical signal in the communication system 1.

In the fourth graph from the top is a graph showing the relationship between the device band and the amplitude in the device band (a device band curve 131) and the relationship between the signal band and the amplitude in the signal band (a signal band curve 132) in the case where the band limit amount and the Q limit margin have the relationship shown at the mark 130 in FIG. 5. The ununiformizing modulation encoding unit 212 sets the signal band to, for example, the band "B" so as to match the signal band with the device band.

Next, an example configuration of the optical reception apparatus 3 will be described.

Figure 7:
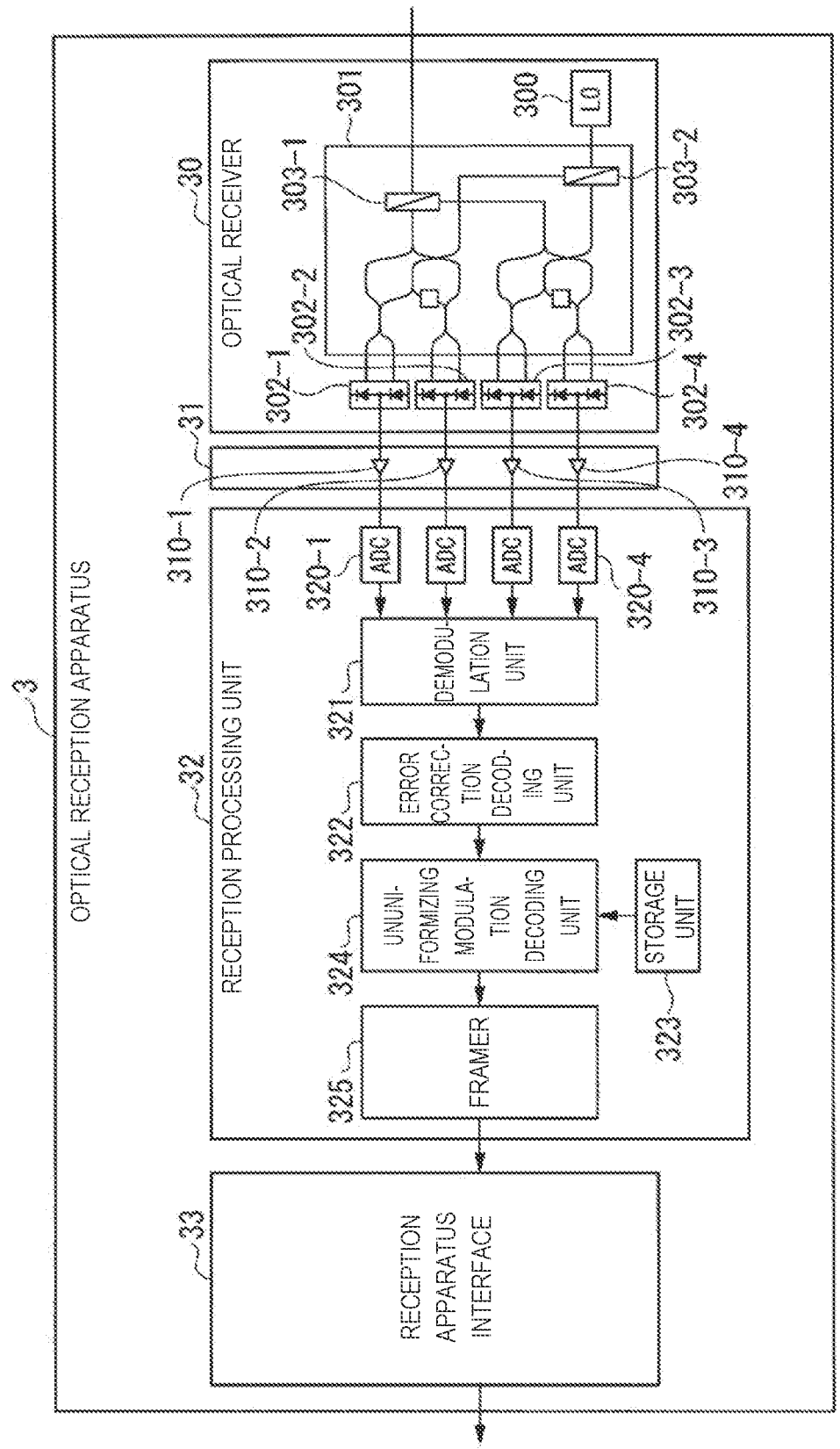
FIG. 7 is a diagram showing an example configuration of the optical reception apparatus in the first embodiment.

FIG. 7 is an example configuration of the optical reception apparatus 3. The optical receiver 30 comprises a local oscillator 300, a 90-degree optical hybrid 301, and balanced photodetectors 302-1 to 302-4. The local oscillator 300 outputs laser light as local oscillation light to the 90-degree optical hybrid 301.

The 90-degree optical hybrid 301 is a functional unit that mixes the received optical signal and the local oscillation light to detect an in-phase signal and a quadrature signal. The 90-degree optical hybrid 301 comprises a polarization beam splitter 303. The polarization beam splitter 303 separates polarization components of light output from the local oscillator 300.

The balanced photodetector 302 detects interference light in the light output from the 90-degree optical hybrid 301 for each polarization component. Here, the balanced photodetector 302-1 outputs a current signal representing the XI signal in the interference light to the amplifier 31. The balanced photodetector 302-2 outputs a current signal representing the XQ signal in the interference light to the amplifier 31. The balanced photodetector 302-3 outputs a current signal representing the YI signal in the interference light to the amplifier 31. The balanced photodetector 302-4 outputs a current signal representing the YQ signal the interference light to the amplifier 31.

The amplifier 31 comprises transimpedance amplifiers 310-1 to 310-4. The transimpedance amplifier 310-1 executes impedance conversion on a current signal representing the XI signal to output the XI signal as an analog signal (voltage signal) to the reception processing unit 32. The transimpedance amplifier 310-2 similarly outputs the XQ signal as an analog signal (voltage signal) to the reception processing unit 32. The transimpedance amplifier 310-3 similarly outputs the YI signal as an analog signal (voltage signal) to the reception processing unit 32. The transimpedance amplifier 310-4 similarly outputs the YQ signal as an analog signal (voltage signal) to the reception processing unit 32.

The reception processing unit 32 comprises analog/digital conversion units 320-1 to 320-4, a demodulation unit 321, an error correction decoding unit 322, a storage unit 323, an ununiformizing modulation decoding unit 324, and a framer 325. The analog/digital conversion unit 320-1 converts the XI signal as an analog signal into the XI signal as a digital signal. The analog/digital conversion unit 320-2 converts the XQ signal as an analog signal into the XQ signal as a digital signal. The analog/digital conversion unit 320-3 converts the YI signal as an analog signal into the YI signal as a digital signal. The analog/digital conversion unit 320-4 converts the YQ signal as an analog signal into the YQ signal as a digital signal.

The demodulation unit 321 executes demodulation processing on the XI signal, the XQ signal, the YI signal, and the YQ signal, which are digital signals. The error correction decoding unit 322 corrects errors having occurred in the demodulated bit sequence.

The storage unit 323 stores amplitude distribution information for each modulation rate of the optical signal. The storage unit 323 stores the same amplitude distribution information as the amplitude distribution information stored in the storage unit 211 of the optical transmission apparatus 2.

The ununiformizing modulation decoding unit 324 records in the storage unit 323 the same amplitude distribution information as the amplitude distribution information stored in the storage unit 211. The ununiformizing modulation decoding unit 324 acquires the amplitude distribution information recorded in the storage unit 323 from, for example, an external apparatus.

When the device band is known, the ununiformizing modulation decoding unit 324 estimates the modulation rate of the optical signal adjusted by the ununiformizing modulation encoding unit 212 so that the signal band may be narrower than the device band. The ununiformizing modulation decoding unit 324 may estimate the modulation rate of the optical signal adjusted by the ununiformizing modulation encoding unit 212 so that the signal band may coincide with the device band.

The ununiformizing modulation decoding unit 324 acquires the amplitude distribution information associated with the estimated modulation rate from the storage unit 323. The ununiformizing modulation decoding unit 324 executes decoding processing, which is inverse processing of the encoding processing by the ununiformizing modulation encoding unit 212, based on the acquired amplitude distribution information. That is, the ununiformizing modulation decoding unit 324 executes inverse processing of the ununiformizing modulation based on the amplitude distribution information (ununiformization demodulation) on the error-corrected bit sequence to decode the bit sequence.

The framer 325 converts the decoded bit sequence into a bit sequence in the predetermined format (frame). The framer 325 outputs the bit sequence in the predetermined format to the reception apparatus interface 33.

Next, the details of the configuration of the ununiformizing modulation encoding unit 212 will be described.

Figure 8:
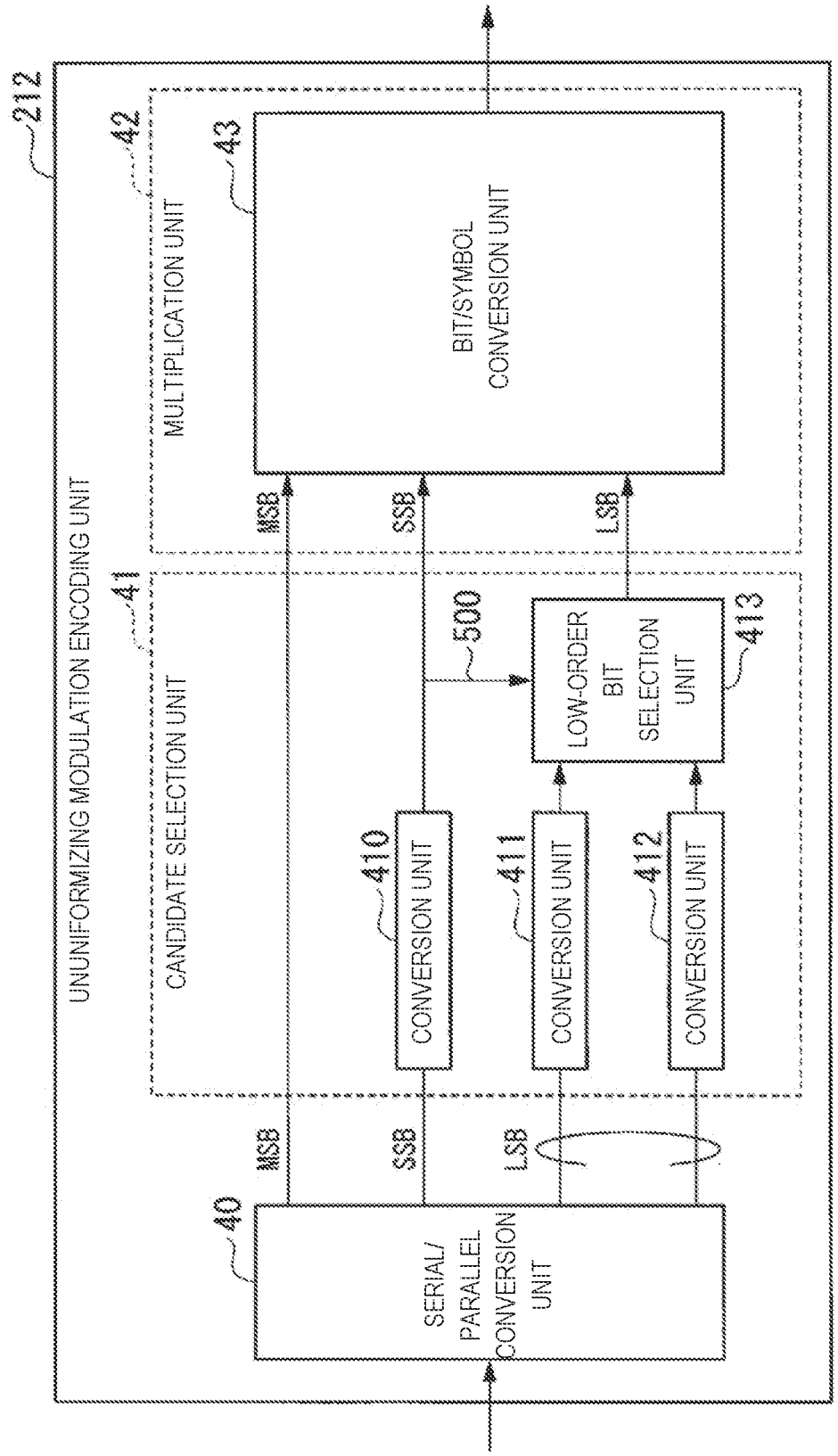
FIG. 8 is a diagram showing an example configuration of an ununiformizing modulation encoding unit in 64QAM in the first embodiment.

FIG. 8 is a diagram showing an example configuration of the ununiformizing modulation encoding unit 212 in 64QAM. The ununiformizing modulation encoding unit 212 in 64QAM comprises a serial/parallel conversion unit 40, a candidate selection unit 41, a multiplication unit 42, and a signal line 500. The candidate selection unit 41 comprises a conversion unit 410, a conversion unit 411, and a conversion unit 412. The multiplication unit 42 comprises a bit/symbol conversion unit 43. The signal line 500 outputs a bit sequence of SSB after entropy conversion by the conversion unit 410 from the conversion unit 410 to a low-order bit selection unit 413.

Figure 9:
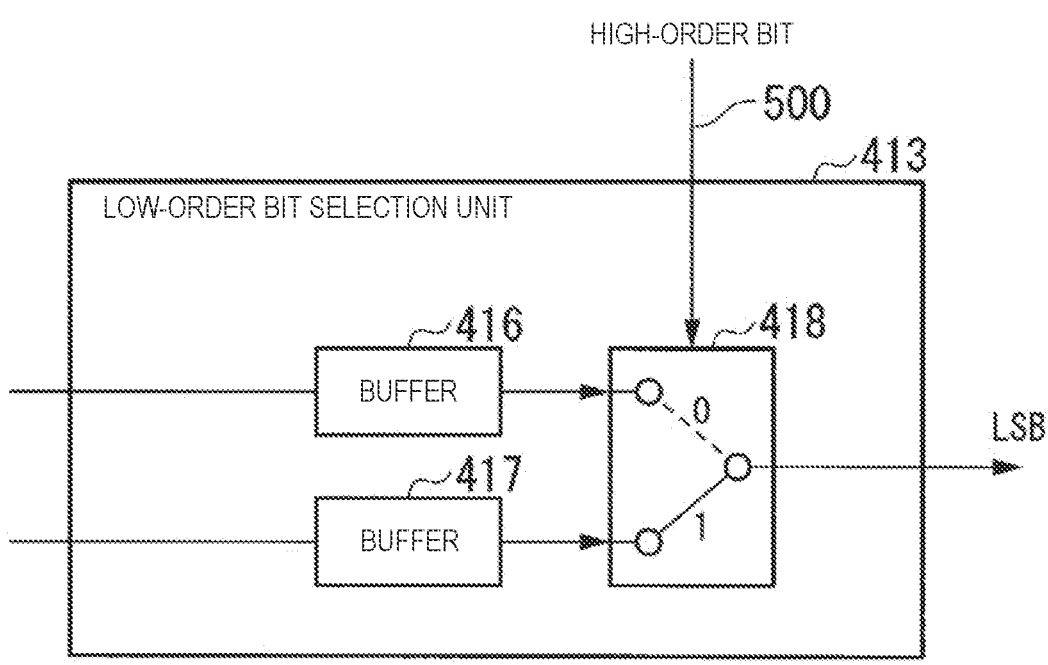
FIG. 9 is a diagram showing an example configuration of a low-order bit selection unit in the first embodiment.

FIG. 9 is a diagram showing an example configuration of the low-order bit selection unit 413. The low-order bit selection unit 413 comprises a buffer 416, a buffer 417, and a switching unit 418. The buffer 416 stores a first bit sequence of LSB. The buffer 417 stores a second bit sequence of LSB. The buffer 416 and the buffer 417 have a queue, and outputs a stored bit in FIFO (first in, first out).

The low-order bit selection unit 413 acquires a high-order bit from the conversion unit 410 via the signal line 500. The low-order bit selection unit 413 selects a bit from among the bit in the first sequence of LSB stored in the buffer 416 and the bit in the second sequence of LSB stored in the buffer 417 according to the acquired high-order bit. The low-order bit selection unit 413 outputs the selected bit to the bit/symbol conversion unit 43 as output of LSB.

For example, when acquiring a bit of 0 in the bit sequence of SSB after entropy conversion from the conversion unit 410, the low-order bit selection unit 413 outputs the bit in the first sequence of LSB stored in the buffer 416 to the bit/symbol conversion unit 43 as output of LSB.

For example, when acquiring a bit of 1 in the bit sequence of SSB after entropy conversion from the conversion unit 410, the low-order bit selection unit 413 outputs the bit in the second sequence of LSB stored in the buffer 417 to the bit/symbol conversion unit 43 as output of LSB.

The bit/symbol conversion unit 43 converts the MSB, SSB, and LSB bit sequences input to the bit/symbol conversion unit 43 into a symbol in the I-axis (in-phase) or the Q-axis (quadrature-phase). That is, the bit/symbol conversion unit 43 executes mapping of a symbol in the I-axis or the Q-axis. The bit/symbol conversion unit 43 outputs a result of converting the bit sequence into a symbol to the error correction encoding unit 213 as a value (code) representing the symbol of the optical signal to be transmitted.

Figure 10:
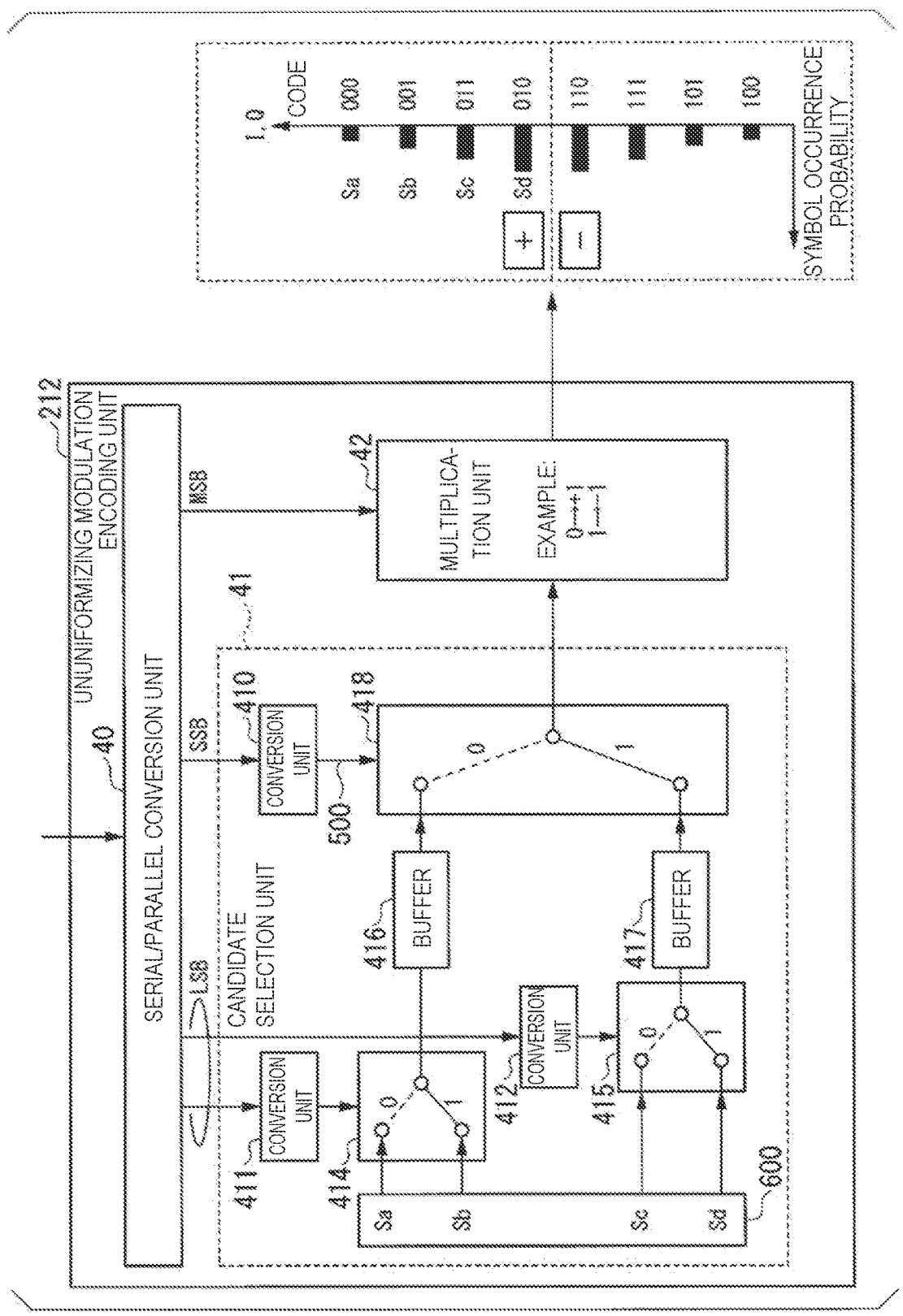
FIG. 10 is a diagram showing an example equivalent configuration of the ununiformizing modulation encoding unit in 64QAM in the first embodiment.

FIG. 10 is a diagram showing an example equivalent configuration of the ununiformizing modulation encoding unit 212 in 64QAM shown in FIG. 8. The ununiformizing modulation encoding unit 212 comprises the serial/parallel conversion unit 40, the candidate selection unit 41, and the multiplication unit 42. The candidate selection unit 41 generates a symbol sequence based on predetermined symbol candidates according to a bit sequence output from the conversion unit 410, a bit sequence output from the conversion unit 411, and a bit sequence output from the conversion unit 412. The candidate selection unit 41 comprises the conversion unit 410, the conversion unit 411, the conversion unit 412, and the signal line 500. The candidate selection unit 41 comprises a storage unit 600.

The candidate selection unit 41 comprises a switching unit 414, a switching unit 415, the buffer 416, the buffer 417, and the switching unit 418. The buffer 416, the buffer 417, and the switching unit 418 have configurations equivalent to those in the low-order bit selection unit 413 shown in FIG. 8. The conversion unit 410, the conversion unit 411, and the conversion unit 412 have configurations equivalent to those of the conversion units shown in FIG. 8.

When the number of the predetermined symbol candidates is ($2^n$), the candidate selection unit 41 comprises ($2^n-1$) conversion units and ($2^n-1$) switching units. In FIG. 10, there are 4 (=$2^2$) predetermined candidates for a symbol of the optical signal to be transmitted, which are Sa, Sb, Sc, and Sd. For this reason, the candidate selection unit 41 comprises 3 (=$2^2-1$) conversion units (the conversion unit 410, the conversion unit 411, and the conversion unit 412), and the switching unit 414, the switching unit 415, and the switching unit 418 as three selection units. The storage unit 600 stores the symbol candidates (Sa, Sb, Sc, Sd) in advance.

The serial/parallel conversion unit 40 outputs the most significant bit sequence with a first sequence length in the bit sequence input to the serial/parallel conversion unit 40 to the multiplication unit 42 as the bit sequence of MSB bit by bit.

The conversion unit 410 outputs the bit sequence of SSB after entropy conversion in which the occurrence probability of 0 or the occurrence probability of 1 is adjusted to the switching unit 418 via the signal line 500 bit by bit. The conversion unit 411 outputs the first bit sequence of LSB after entropy conversion in which the occurrence probability of 0 or the occurrence probability of 1 is adjusted to the switching unit 414 bit by bit. The conversion unit 412 outputs the second bit sequence of LSB after entropy conversion in which the occurrence probability of 0 or the occurrence probability of 1 is adjusted to the switching unit 415 bit by bit.

The switching unit 414 acquires the first bit sequence of LSB after entropy conversion in which the occurrence probability of 0 or the occurrence probability of 1 is adjusted from the conversion unit 411 bit by bit. When the bit in the first bit sequence of LSB after entropy conversion is 0, the switching unit 414 outputs the symbol Sa, which is one of the candidates for the symbol of the optical signal to be transmitted, to the buffer 416. When the bit in the first bit sequence of LSB after entropy conversion is 1, the switching unit 414 outputs the symbol Sb, which is one of the candidates for the symbol of the optical signal to be transmitted, to the buffer 416.

The switching unit 415 acquires the second bit sequence of LSB after entropy conversion in which the occurrence probability of 0 or the occurrence probability of 1 is adjusted from the conversion unit 412 bit by bit. When the bit in the second bit sequence of LSB after entropy conversion is 0, the switching unit 415 outputs the symbol Sc, which is one of the candidates for the symbol of the optical signal to be transmitted, to the buffer 417. When the bit in the second bit sequence of LSB after entropy conversion is 1, the switching unit 415 outputs the symbol Sd, which is one of the candidates for the symbol of the optical signal to be transmitted, to the buffer 417.

The buffer 416 and the buffer 417 are a volatile recording medium such as a RAM (random access memory). The buffer 416 and the buffer 417 may be a non-volatile storage apparatus (non-transitory recording medium) such as a flash memory.

The buffer 416 temporarily stores the symbol Sa or the symbol Sb output from the switching unit 414. The buffer 417 temporarily stores the symbol Sc or the symbol Sd output from the switching unit 415. The buffer 416 and the buffer 417 have a queue, and output a symbol sequence in FIFO (first in, first out).

The switching unit 418 acquires the bit sequence of SSB after entropy conversion in which the occurrence probability of 0 or the occurrence probability of 1 is adjusted from the conversion unit 410 bit by bit. When the bit in the bit sequence of SSB after entropy conversion is 0, the switching unit 418 outputs the symbol Sa or the symbol Sb stored in the buffer 416 to the multiplication unit 42. When the bit in the bit sequence of SSB after entropy conversion is 1, the switching unit 418 outputs the symbol Sc or the symbol Sd stored in the buffer 417 to the multiplication unit 42.

The multiplication unit 42 acquires the bit sequence of MSB from the serial/parallel conversion unit 40 bit by bit. The multiplication unit 42 acquires one symbol selected from among the symbol candidates (the symbol Sa, the symbol Sb, the symbol Sc, and the symbol Sd) from the switching unit 418 for each bit in the bit sequence of SSB after entropy conversion.

The multiplication unit 42 multiplies the code of the acquired symbol (the value representing the symbol) by a real number according to the bit in the bit sequence of MSB. For example, when the bit in the bit sequence of MSB is 0, the multiplication unit 42 multiplies the code of the acquired symbol by (+1). For example, when the bit in the bit sequence of MSB is 1, the multiplication unit 42 multiplies the code of the acquired symbol by (−1). The multiplication unit 42 outputs a result of multiplying the code of the symbol by the real number to the error correction encoding unit 213.

Figure 11:
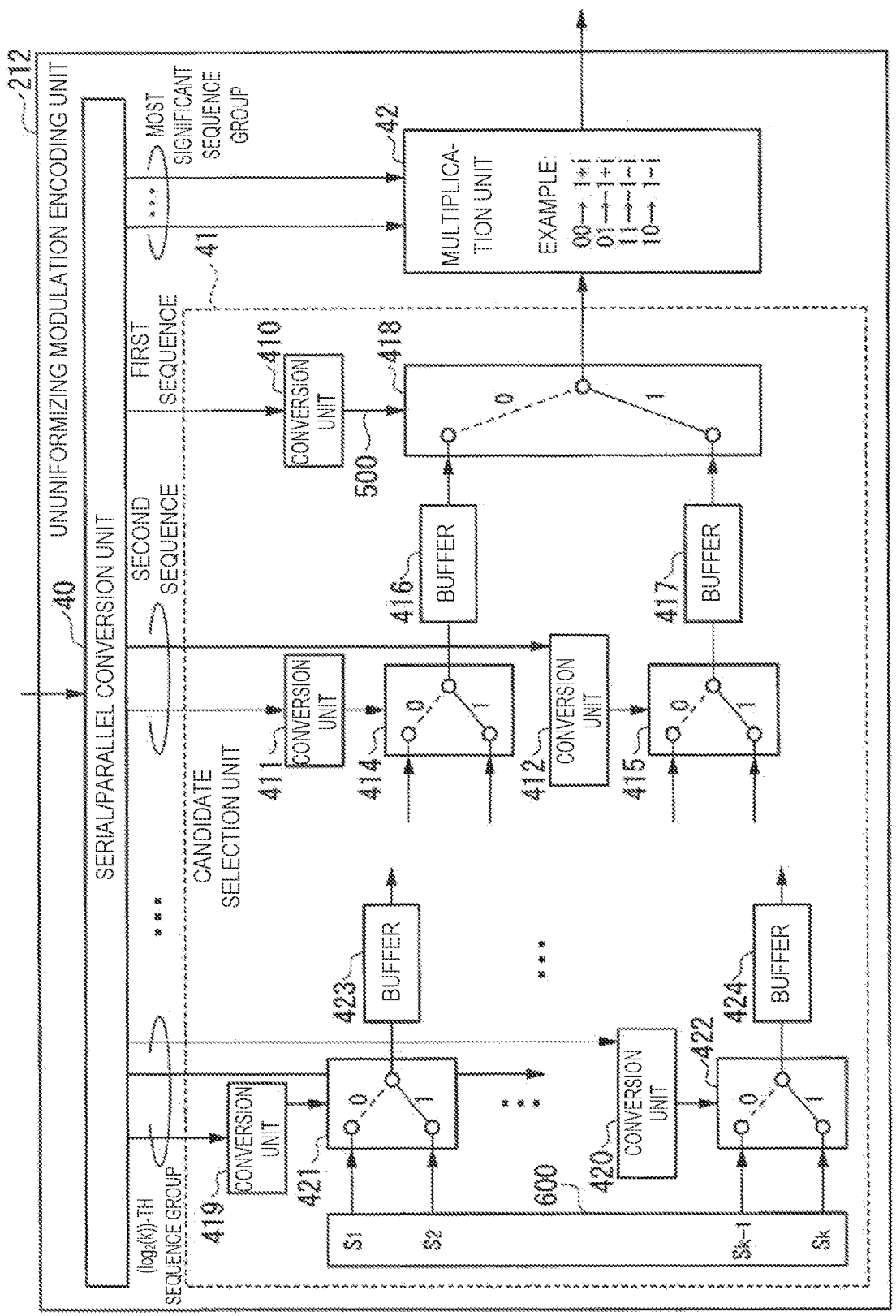
FIG. 11 is a diagram showing an example configuration of a generalized ununiformizing modulation encoding unit in the first embodiment.

FIG. 11 is a diagram showing an example configuration of a generalized ununiformizing modulation encoding unit 212. The ununiformizing modulation encoding unit 212 comprises the serial/parallel conversion unit 40, the candidate selection unit 41, and the multiplication unit 42. The candidate selection unit 41 comprises conversion units in multiple stages. In FIG. 11, the candidate selection unit 41 comprises the conversion unit 410, the conversion unit 411, the conversion unit 412, a conversion unit 419, a conversion unit 420, a buffer 423, a buffer 424, and a plurality of signal lines such as the signal line 500.

The serial/parallel conversion unit 40 divides a bit sequence input to the serial/parallel conversion unit 40 into respective bit sequences, which are the most significant sequence group and the first to ($\log_2(k)$)-th sequence groups, in the order from the high-order bit sequence to the low-order bit sequence. Here, k is an integer represented by $2^{(\log_2 2N-1)}=N/2$. For example, in the case of 16QAM, k=2. In the case of 64QAM, k=4. The sequence length of the bit sequence input to the serial/parallel conversion unit 40 is equal to the sum of the sequence lengths of the bit sequences of the most significant sequence group and the sequence lengths of the respective bit sequences from the first sequence group to the ($\log_2(k)$)-th sequence group.

The number of conversion units from the first sequence group to the ($\log_2(k)$)-th sequence group is ($2^{(\log (k))}-1$).

The serial/parallel conversion unit 40 outputs the most significant bit sequence with the first sequence length in the bit sequence input to the serial/parallel conversion unit 40 to the multiplication unit 42 as the bit sequences of the most significant sequence group.

The serial/parallel conversion unit 40 outputs the second-most significant bit sequence with a second sequence length in the bit sequence input to the serial/parallel conversion unit 40 to the conversion unit 410 as the bit sequence of the first sequence group.

The serial/parallel conversion unit 40 outputs the third-most significant bit sequence with a third sequence length in the bit sequence input to the serial/parallel conversion unit 40 to the conversion unit 411 as the first bit sequence of the second sequence group. The serial/parallel conversion unit 40 outputs the fourth-most significant bit sequence with a fourth sequence length in the bit sequence input to the serial/parallel conversion unit 40 to the conversion unit 412 as the second bit sequence of the second sequence group.

Thus, the serial/parallel conversion unit 40 divides the bit sequence input to the serial/parallel conversion unit 40 into the respective bit sequences, which are the most significant sequence group and the first to ($\log_2(k)$)-th sequence groups.

The conversion unit 419 is an entropy conversion circuit that converts a bit sequence input to the conversion unit 419 into a bit sequence in which the occurrence probability of 0 or the occurrence probability of 1 is a predetermined occurrence probability. The conversion unit 419 executes entropy conversion, which changes the occurrence probability of 0 or the occurrence probability of 1, on the first bit sequence of the ($\log_2(k)$)-th sequence group in the conversion unit 419. The conversion unit 419 outputs the first bit sequence of the ($\log_2(k)$)-th sequence group after entropy conversion to the switching unit 421.

The conversion unit 420 is an entropy conversion circuit that converts a bit sequence input to the conversion unit 420 into a bit sequence in which the occurrence probability of 0 or the occurrence probability of 1 is the predetermined occurrence probability. The conversion unit 420 executes entropy conversion, which changes the occurrence probability of 0 or the occurrence probability of 1, on the (k/2)-th bit of the ($\log_2(k)$)-th sequence group input to the conversion unit 420. The conversion unit 419 outputs the (k/2)-th bit sequence of the ($\log_2(k)$)-th sequence group after entropy conversion to the switching unit 421.

The switching unit 421 acquires the first bit sequence of the ($\log_2(k)$)-th sequence group after entropy conversion in which the occurrence probability of 0 or the occurrence probability of 1 is adjusted from the conversion unit 419 bit by bit. When the bit in the first bit sequence of the ($\log_2(k)$)-th sequence group after entropy conversion is 0, the switching unit 421 outputs the symbol $S_1$, which is one of the candidates for the symbol of the optical signal to be transmitted, to the buffer 423. When the bit in the first bit sequence of the ($\log_2(k)$)-th sequence group after entropy conversion is 1, the switching unit 421 outputs the symbol $S_2$, which is one of the candidates for the symbol of the optical signal to be transmitted, to the buffer 423. The buffer 423 has a queue, and outputs a symbol sequence in FIFO.

The switching unit 422 acquires the (k/2)-th bit sequence of the ($\log_2(k)$)-th sequence group after entropy conversion in which the occurrence probability of 0 or the occurrence probability of 1 is adjusted from the conversion unit 420 bit by bit. When the bit in the (k/2)-th bit sequence of the ($\log_2(k)$)-th sequence group after entropy conversion is 0, the switching unit 422 outputs the symbol $S_{k-1}$, which is one of the candidates for the symbol of the optical signal to be transmitted, to the buffer 424. When the bit in the (k/2)-th bit sequence of the ($\log_2(k)$)-th sequence group after entropy conversion is 1, the switching unit 421 outputs the symbol $S_k$, which is one of the candidates for the symbol of the optical signal to be transmitted, to the buffer 424. The buffer 424 has a queue, and outputs a symbol sequence in FIFO.

The candidate selection unit 41 comprises the switching unit 414, the switching unit 415, the buffer 416, the buffer 417, the switching unit 418, the switching unit 421, the switching unit 422, the buffer 423, and the buffer 424. The switching unit 414, the switching unit 415, the buffer 416, the buffer 417, and the switching unit 418 have configurations equivalent to those in the low-order bit selection unit 413 shown in FIG. 8. The number of the switching units from the first sequence group to the ($\log_2(k)$)-th sequence group is the same as the number of the conversion units, i.e., ($2^{(\log_2(k))}-1$).

In FIG. 11, there are k candidates for the symbol of the optical signal to be transmitted, which are $S_1$ to $S_k$. When the number of the predetermined symbol candidates is k (=$2^n$), the candidate selection unit 41 comprises ($2^n-1$) conversion units and ($2^n-1$) switching units. Each conversion unit, each switching unit, and each buffer shown in FIG. 11 operate similarly to each conversion unit, each switching unit, and each buffer shown in FIG. 10.

The multiplication unit 42 acquires the bit sequences of the most significant sequence group from the serial/parallel conversion unit 40 bit by bit. The multiplication unit 42 acquires one symbol selected from among the symbol candidates ($S_1$ to $S_k$) from the switching unit 418 for each bit in the bit sequence of the first sequence after entropy conversion.

The multiplication unit 42 may multiply the acquired symbol code by any number (complex number) according to a bit sequence in the bit sequences of the most significant sequence group. For example, when the bit sequence in the bit sequences of the most significant sequence group is "00", the multiplication unit 42 multiplies the code of the acquired symbol by a complex number of (1+i). For example, when the bit sequence in the bit sequences of the most significant sequence group is "01", the multiplication unit 42 multiplies the code of the acquired symbol by a complex number of (−1+i). For example, when the bit sequence in the bit sequences of the most significant sequence group is "11", the multiplication unit 42 multiplies the code of the acquired symbol by a complex number of (−1−i). For example, when the bit sequence in the bit sequences of the most significant sequence group is "10", the multiplication unit 42 multiplies the code of the acquired symbol by a complex number of (1−i). The multiplication unit 42 outputs a result of multiplying the code of the symbol by any number to the error correction encoding unit 213.

Note that the ununiformizing modulation encoding unit 212 can also deal with a case where the number of the predetermined symbol candidates is not a "power of two" by, for example, adjusting the number of the conversion units and the switching units provided in the ununiformizing modulation encoding unit 212 to a number that is not a "power of two". In addition, the ununiformizing modulation encoding unit 212 can deal with a case where the number of the predetermined symbol candidates is not a "power of two" by using partial conversion units and switching units among the plurality of conversion units and switching units provided in the ununiformizing modulation encoding unit 212.

Next, the details of the configuration of the ununiformizing modulation decoding unit 324 will be described.

Figure 12:
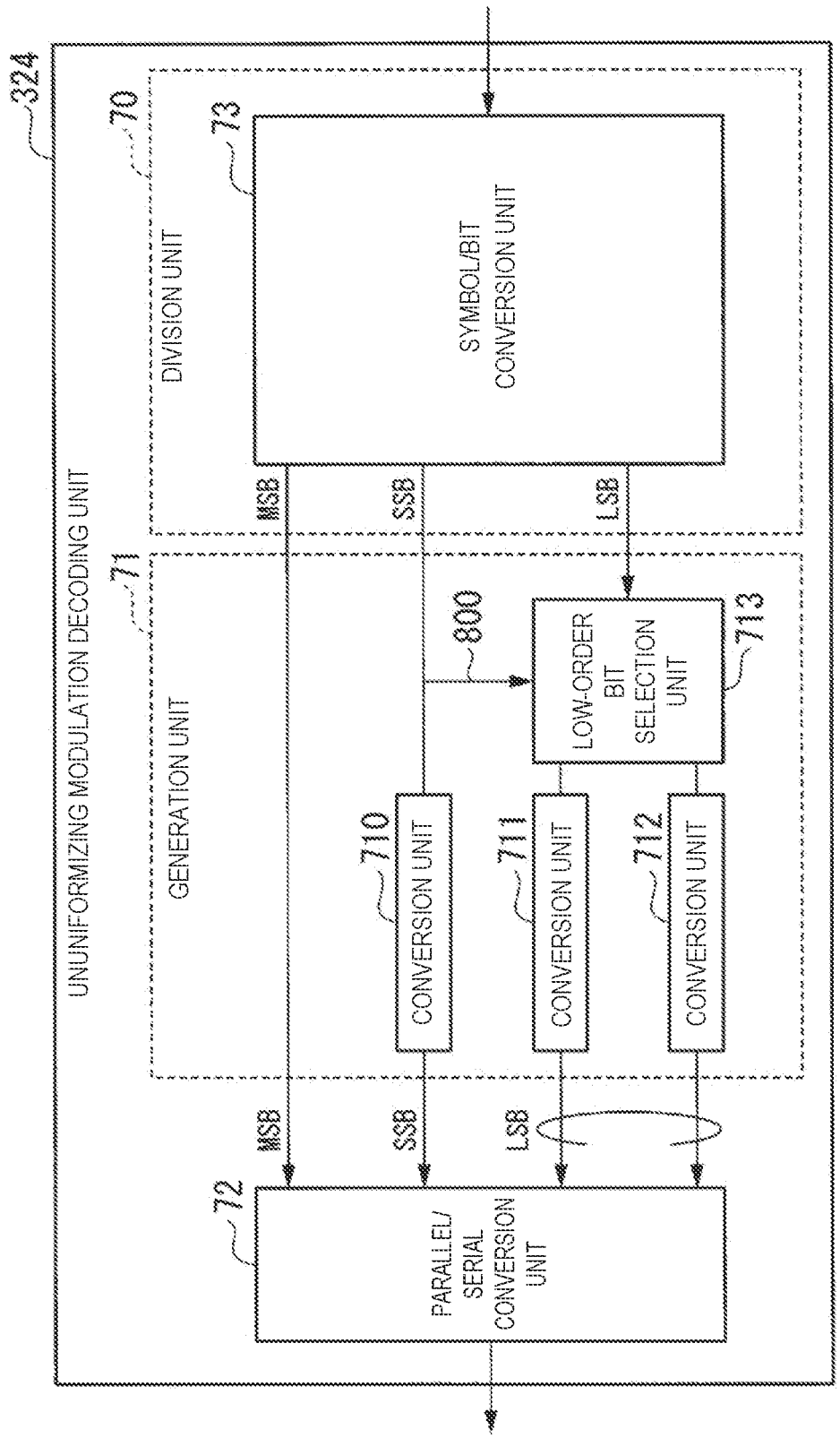
FIG. 12 is a diagram showing an example configuration of an ununiformizing modulation decoding unit in 64QAM in the first embodiment.

FIG. 12 is a diagram showing an example configuration of the ununiformizing modulation decoding unit 324 in 64QAM. The ununiformizing modulation decoding unit 324 comprises a division unit 70, a generation unit 71, and a parallel/serial conversion unit 72. The division unit 70 comprises a symbol/bit conversion unit 73. The generation unit 71 comprises a conversion unit 710, a conversion unit 711, a conversion unit 712, a low-order bit selection unit 713, and a signal line 800.

The symbol/bit conversion unit 73 converts the value representing the symbol of the received optical signal into a bit sequence. The symbol/bit conversion unit 73 outputs a bit sequence of SSB converted into the bit sequence to the low-order bit selection unit 713 via the signal line 800. Here, the symbol/bit conversion unit 73 outputs the bit sequence of SSB before entropy conversion by the conversion unit 710 to the low-order bit selection unit 713 via the signal line 800.

The conversion unit 710 executes entropy conversion on the bit sequence of SSB to generate a bit sequence of SSB after entropy conversion. The sequence length of the bit sequence of SSB input to the conversion unit 710 is more than the second sequence length of the bit sequence of SSB after entropy conversion. The conversion unit 711, the conversion unit 712, and the low-order bit selection unit 713 generate a first bit sequence of LSB after entropy conversion and a second bit sequence of LSB after entropy conversion according to the bit sequence of SSB. The parallel/serial conversion unit 72 executes parallel/serial conversion processing on the bit sequence of MSB, the bit sequence of SSB after entropy conversion, the first bit sequence of LSB after entropy conversion, and the second bit sequence of LSB after entropy conversion.

Thus, the demodulation processing by the ununiformizing modulation decoding unit 324 is inverse processing of the modulation processing by the ununiformizing modulation encoding unit 212. Accordingly, the direction of the flow of the bit sequence in the ununiformizing modulation decoding unit 324 and the direction of the flow of the bit sequence in the ununiformizing modulation encoding unit 212 are opposite to each other in principle.

By way of exception, the direction of the flow of the bit sequence in the signal line 500 of the ununiformizing modulation encoding unit 212 and the direction of the flow of the bit sequence in the signal line 800 in the ununiformizing modulation decoding unit 324 are the same as each other. That is, the direction of the flow of the bit sequence in the signal line 800 of the ununiformizing modulation decoding unit 324 is the direction from the conversion unit 710 to the low-order bit selection unit 713. The direction of the flow of the bit sequence in the signal line 500 of the ununiformizing modulation encoding unit 212 is the direction from the conversion unit 410 to the low-order bit selection unit 413. Similarly, the direction of a signal line 801 is the same as the direction of a signal line 501. The direction of a signal line 802 is the same as the direction of a signal line 502. The direction of a signal line 803 is the same as the direction of a signal line 503.

As described above, the communication system 1 of the first embodiment comprises the optical transmission apparatus 2, the optical reception apparatus 3, and the transmission path for an optical signal. The optical transmission apparatus 2 has the storage unit 211, the ununiformizing modulation encoding unit 212 (control unit), and the optical transmitter 23. The storage unit 211 stores the amplitude distribution information in association with the modulation rate of the optical signal. The ununiformizing modulation encoding unit 212 selects a modulation rate based on the signal band and the device band. The ununiformizing modulation encoding unit 212 controls the occurrence probability of a symbol of the optical signal based on the amplitude distribution information associated with the selected modulation rate. The optical transmitter 23 transmits the optical signal of the symbol of which the occurrence probability is controlled. The optical reception apparatus 3 has the optical receiver 30 and the ununiformizing modulation decoding unit 324 (decoding unit). The optical receiver 30 receives the optical signal of the symbol of which the occurrence probability is controlled. The storage unit 323 stores the amplitude distribution information, which is the same as the amplitude distribution information stored in the storage unit 211, in association with the modulation rate of the optical signal. The ununiformizing modulation decoding unit 324 detects the modulation rate selected by the ununiformizing modulation encoding unit 212. The ununiformizing modulation decoding unit 324 decodes the symbol of the received optical signal based on the amplitude distribution information associated with the detected modulation rate.

This enables the communication system 1 of the first embodiment to improve the transmission characteristics of the optical signal.

The ununiformizing modulation encoding unit 212 selects the modulation rate of the optical signal so that, for example, the signal band may coincide with the device band or the signal band may be narrower the device band. The ununiformizing modulation encoding unit 212 controls the occurrence probability of the symbol of the optical signal to be transmitted so that, for example, the distribution of occurrence probabilities of the symbols in the constellation map may become the distribution of occurrence probabilities of the symbols in the amplitude distribution information.

Second Embodiment

The second embodiment is different from the first embodiment in that the characteristics of the device band are unknown. In the second embodiment, differences from the first embodiment will be described.

Figure 13:
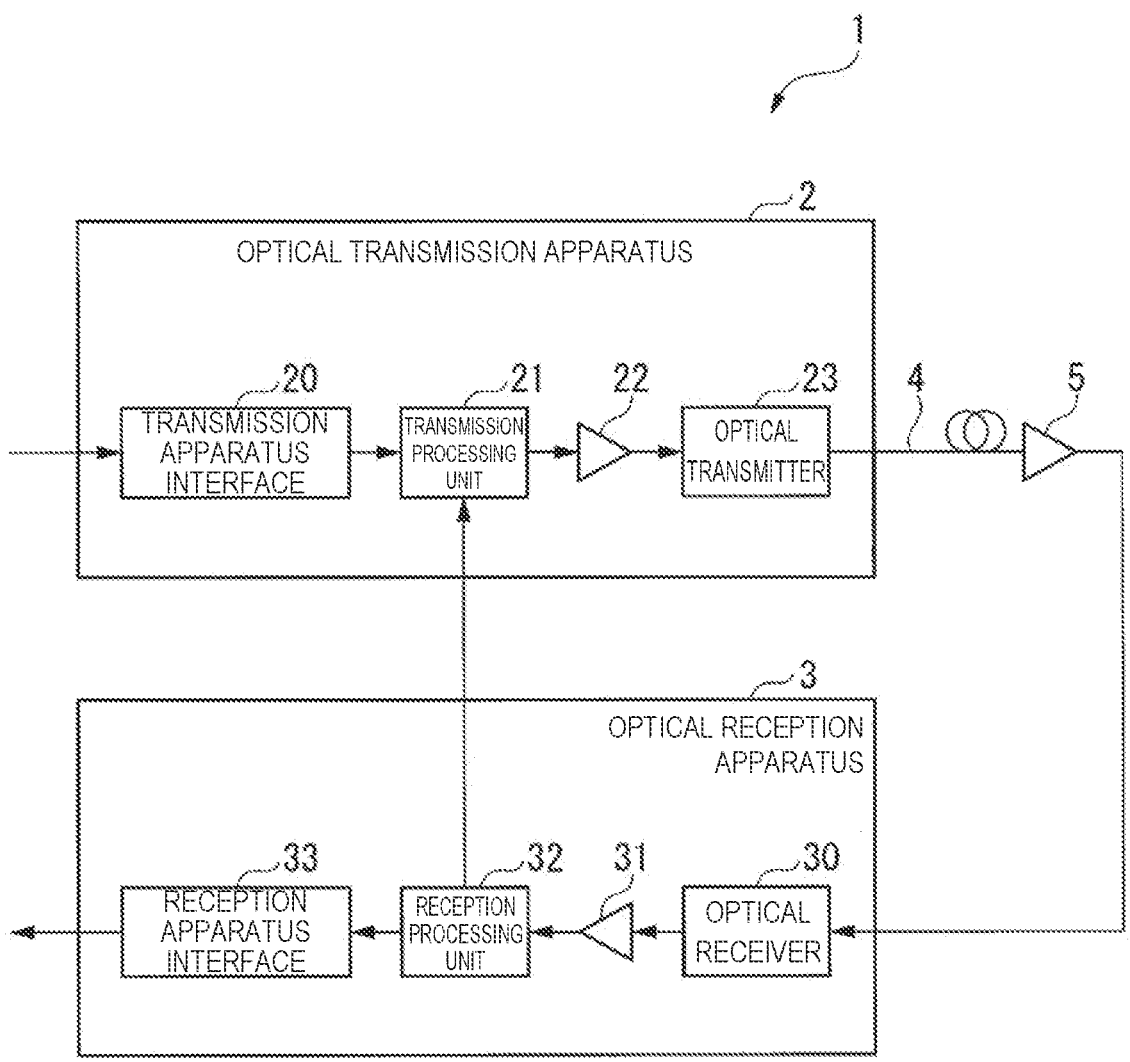
FIG. 13 is a diagram showing an example configuration of the communication system in a second embodiment.

FIG. 13 is a diagram showing an example configuration of the communication system 1. The communication system 1 comprises the optical transmission apparatus 2 and the optical reception apparatus 3. The optical transmission apparatus 2 comprises the transmission apparatus interface 20, the transmission processing unit 21, the driver 22, and the optical transmitter 23. In order for the optical reception apparatus 3 to measure the device band, the transmission processing unit 21 transmits the optical signal of a test signal, which is a random signal with a broad band, to the optical reception apparatus 3. The transmission processing unit 21 may sweep a tone signal for each predetermined band while transmitting the tone signal to the optical reception apparatus 3.

The optical reception apparatus 3 comprises the optical receiver 30, the amplifier 31, the reception processing unit 32, and the reception apparatus interface 33. The reception processing unit 32 receives the test signal from the optical reception apparatus 3. The reception processing unit 32 executes demodulation processing on the test signal. The reception processing unit 32 acquires information on the device band from the test signal. For example, the reception processing unit 32 calculates the device band based on tap coefficients of an adaptive equalization filter. The reception processing unit 32 may measure the device band using a functional unit for measuring frequencies (spectrum analyzer).

The reception processing unit 32 feeds back the information on the device band to the transmission processing unit 21. The reception processing unit 32 generates amplitude distribution information based on the device band. The ununiformizing modulation decoding unit 324 predetermines an amplitude sequence distribution according to the modulation rate of the optical signal so that the signal band may coincide with the device band or the signal band may be narrower than the device band. The reception processing unit 32 records the amplitude distribution information representing the predetermined amplitude sequence distribution in the storage unit 323 for each modulation rate of the optical signal.

The transmission processing unit 21 acquires the information on the device band from the reception processing unit 32. The transmission processing unit 21 generates the amplitude distribution information based on the device band. The ununiformizing modulation encoding unit 212 predetermines the amplitude sequence distribution according to the modulation rate of the optical signal so that the signal band may coincide with the device band or the signal band may be narrower than the device band. The transmission processing unit 21 records the amplitude distribution information in the storage unit 211 for each modulation rate of the optical signal.

The ununiformizing modulation encoding unit 212 selects a modulation rate of the optical signal based on the information on the device band fed back from the reception processing unit 32 to the transmission processing unit 21 and information on the signal band. The ununiformizing modulation encoding unit 212 acquires the amplitude distribution information associated with the selected modulation rate from the storage unit 211. The ununiformizing modulation encoding unit 212 acquires a bit sequence in the predetermined format from the framer 210. The ununiformizing modulation encoding unit 212 encodes the acquired bit sequence using an ununiformizing modulation technique based on the acquired amplitude distribution information.

As described above, the ununiformizing modulation encoding unit 212 (control unit) of the second embodiment selects a modulation rate of the optical signal based on the information on the device band fed back from the optical reception apparatus 3 to the optical transmission apparatus 2 and the information on the signal band.

This enables the communication system 1 of the second embodiment to improve the transmission characteristics of the optical signal even when the characteristics of the device band are unknown.

Although embodiments of this invention have been described above in detail with reference to the drawings, the specific configuration is not limited to these embodiments, and designs and the like within the range not departing from the spirit of this invention are also included.

The optical transmission apparatus and the optical reception apparatus in the embodiments described above may be implemented on a computer. In that case, they may be implemented by recording a program for implementing this function in a computer-readable recording medium, and causing a computer system to read and execute the program recorded in this recording medium. Note that "computer system" used herein shall include an OS and hardware such as peripheral equipment. In addition, a "computer-readable recording medium" refers to a portable medium such as a flexible disk, a magneto-optical disk, a ROM, and a CD-ROM, and a storage apparatus such as a hard disk built in the computer system. Furthermore, a "computer-readable recording medium" may also include something for dynamically holding a program for a short period of time such as a communication line in the case of transmitting the program via a network such as the Internet or a communication line such as a telephone line, and something for holding a program for a certain period of time such as a volatile memory inside a computer system serving as a server or a client in that case. In addition, the above program may be one for implementing a part of the above-described function, one capable of implementing the above-described function in combination with a program already recorded in the computer system, or one implemented using a programmable logic device such as an FPGA (field programmable gate array).

INDUSTRIAL APPLICABILITY

The present invention is applicable to an optical communication system.

REFERENCE SIGNS LIST

1 Communication system
2 Optical transmission apparatus
3 Optical reception apparatus
4 Optical fiber
5 Amplification unit
20 Transmission apparatus interface
21 Transmission processing unit
22 Driver
23 Optical transmitter
30 Optical receiver
31 Amplifier
32 Reception processing unit
33 Reception apparatus interface
40 Serial/parallel conversion unit
41 Candidate selection unit
42 Multiplication unit
70 Division unit
71 Generation unit
72 Parallel/serial conversion unit
73 Symbol/bit conversion unit
100 Mark
101 Device band curve
102 Signal band curve
110 Mark
111 Device band curve
112 Signal band curve
120 Mark
121 Device band curve
122 Signal band curve
130 Mark
131 Device band curve
132 Signal band curve
140 Mark
150 Mark
160 Mark
170 Mark
210 Framer
211 Storage unit
212 Ununiformizing modulation encoding unit
213 Error correction encoding unit 214 Modulation unit
215 Digital/analog conversion unit
220 Modulator driver
230 Signal light source
231 Polarization modulator
232 Polarization beam combiner
300 Local oscillator
301 90-degree optical hybrid
302 Balanced photodetector
303 Polarization beam splitter
310 Transimpedance amplifier
320 Analog/digital conversion unit
321 Demodulation unit
322 Error correction decoding unit
324 Ununiformizing modulation decoding unit
325 Framer
410 Conversion unit
411 Conversion unit
412 Conversion unit
413 low-order bit selection unit
414 Switching unit
415 Switching unit
416 Buffer
417 Buffer
418 Switching unit
419 Conversion unit
420 Conversion unit
421 Switching unit
422 Switching unit
423 Buffer
424 Buffer
500 Signal line
600 Storage unit
710 Conversion unit
711 Conversion unit
712 Conversion unit
713 low-order bit selection unit
800 Signal line
A Modulation band
B Modulation band

The invention claimed is:

1. A communication system comprising an optical transmission apparatus, an optical reception apparatus, and a transmission path for an optical signal, wherein:
the optical transmission apparatus has:
a first storage unit that stores amplitude distribution information, which is information representing a distribution of occurrence probabilities of symbols of an optical signal, in association with a modulation rate of an optical signal;
a control unit that selects the modulation rate based on a signal band and a device band that is a band in which the optical transmission apparatus, the optical reception apparatus, and the transmission path allow passage of an optical signal, and controls an occurrence probability of a symbol of an optical signal based on the amplitude distribution information associated with the selected modulation rate; and
an optical transmitter that transmits an optical signal of a symbol of which the occurrence probability is controlled; and
the optical reception apparatus has:
an optical receiver that receives an optical signal of a symbol of which the occurrence probability is controlled;
a second storage unit that stores the amplitude distribution information in association with the modulation rate; and
a decoding unit that detects the selected modulation rate, and decodes a symbol of a received optical signal based on the amplitude distribution information associated with the detected modulation rate.

2. The communication system according to claim 1, wherein the control unit selects the modulation rate so that the signal band coincides with the device band or the signal band is narrower than the device band.

3. The communication system according to claim 1, wherein the control unit controls an occurrence probability of a symbol of an optical signal to be transmitted so that a distribution of occurrence probabilities of symbols in a constellation map becomes a distribution of occurrence probabilities of symbols in the amplitude distribution information.

4. The communication system according to claim 1, wherein a distribution of occurrence probabilities of symbols is a Maxwell-Boltzmann distribution.

5. The communication system according to claim 1, wherein the control unit selects the modulation rate based on information on the device band fed back from the optical reception apparatus to the optical transmission apparatus and information on the signal band.

6. An optical transmission apparatus in a communication system comprising the optical transmission apparatus, an optical reception apparatus, and a transmission path for an optical signal, the optical transmission apparatus comprising:
a storage unit that stores amplitude distribution information, which is information representing a distribution of occurrence probabilities of symbols of an optical signal, in association with a modulation rate of an optical signal;
a control unit that selects the modulation rate based on a signal band and a device band that is a band in which the own apparatus, the optical reception apparatus, and the transmission path allow passage of an optical signal, and controls an occurrence probability of a symbol of an optical signal based on the amplitude distribution information associated with the selected modulation rate; and
an optical transmitter that transmits an optical signal of a symbol of which the occurrence probability is controlled.

7. The optical transmission apparatus according to claim 6, wherein the control unit selects the modulation rate so that the signal band coincides with the device band or the signal band is narrower than the device band.

8. An optical reception apparatus in a communication system comprising an optical transmission apparatus, the optical reception apparatus, and a transmission path for an optical signal, the optical reception apparatus comprising:
an optical receiver that receives an optical signal of a symbol of which an occurrence probability is controlled;
a storage unit that stores amplitude distribution information, which is information representing a distribution of occurrence probabilities of symbols of an optical signal in association with a modulation rate of an optical signal; and
a decoding unit that detects a modulation rate selected by the optical transmission apparatus, and decodes a symbol of a received optical signal based on the amplitude distribution information associated with the detected modulation rate.

* * * * *